US007564669B2

(12) United States Patent
Kauffman

(10) Patent No.: US 7,564,669 B2
(45) Date of Patent: Jul. 21, 2009

(54) PROTECTIVE DEVICE

(76) Inventor: George M. Kauffman, 14 Abigail Dr., Hudson, MA (US) 01749

( * ) Notice: Subject to any disclaimer, the term of this patent is extended or adjusted under 35 U.S.C. 154(b) by 0 days.

(21) Appl. No.: 11/974,720

(22) Filed: Oct. 16, 2007

(65) Prior Publication Data

US 2008/0043396 A1 Feb. 21, 2008

Related U.S. Application Data

(63) Continuation of application No. 10/727,076, filed on Dec. 2, 2003, now Pat. No. 7,440,253, which is a continuation-in-part of application No. PCT/US02/18919, filed on Jun. 14, 2002.

(60) Provisional application No. 60/298,439, filed on Jun. 15, 2001.

(51) Int. Cl.
*H02H 1/04* (2006.01)
*H02H 1/00* (2006.01)

(52) U.S. Cl. ...................................................... 361/120

(58) Field of Classification Search ................. 361/119, 361/120

See application file for complete search history.

(56) References Cited

U.S. PATENT DOCUMENTS 2,828,447 A * 3/1958 Mauchly ..................... 365/129
3,193,779 A 7/1965 Beaty
3,230,316 A * 1/1966 Hunt .......................... 379/180
4,142,220 A * 2/1979 Lundsgaard ................ 361/120
4,389,624 A 6/1983 Aihara et al.
4,554,608 A 11/1985 Block
4,912,589 A * 3/1990 Stolarczyk .................. 361/56
4,985,800 A * 1/1991 Feldman et al. ............. 361/113
5,712,755 A * 1/1998 Glaser et al. ................ 361/119
5,953,195 A 9/1999 Pagliuca
5,982,602 A 11/1999 Tellas et al.
6,061,223 A 5/2000 Jones et al.
6,115,227 A 9/2000 Jones et al.
6,236,551 B1 5/2001 Jones et al.
6,529,357 B1 3/2003 Landinger et al.
6,636,407 B1 10/2003 Ryman

* cited by examiner

*Primary Examiner*—Ronald W Leja
(74) *Attorney, Agent, or Firm*—Kriegsman & Kriegsman

(57) ABSTRACT

A protective device for transmitting electromagnetic signals of a desired frequency band from a source to a load comprises an outer conductor, an inner conductor extending coaxially within the outer conductor and a quarter wavelength shunt conductor. The shunt conductor is connected, at one end, to the inner conductor and is connected, at its other end, to the outer conductor by means of distributed capacitance through a dielectric insulator. A plurality of gas discharge tubes are connected at one end to the shunt conductor and at the other end to the outer conductor. In use, the inner conductor serves as the transmission line, the outer conductor serves as the return path and the quarter wavelength shunt conductor serves as an inductor for filtering out electromagnetic energy which falls outside the desired frequency band, the plurality of gas discharge tubes operating electrically in parallel with one another to discharge shunted voltages.

5 Claims, 15 Drawing Sheets

PROTECTIVE DEVICE

CROSS-REFERENCE TO RELATED APPLICATIONS

The present application is a continuation of U.S. patent application Ser. No. 10/727,076, filed Dec. 2, 2003 now U.S. Pat. No. 7,440,253, the disclosure of which is incorporated herein by reference, which in turn is a continuation-in-part of PCT Application Number PCT/US02/18919 filed Jun. 14, 2002, which, in turn, claims the benefit of U.S. Provisional Patent Application Ser. No. 60/298,439, which was filed on Jun. 15, 2001 in the name of George M. Kauffman.

BACKGROUND OF THE INVENTION

The present invention relates generally to devices for transmitting electromagnetic signals of a desired frequency band and more particularly to devices for transmitting electromagnetic signals of a desired frequency band which are designed to deflect electromagnetic energy which falls outside of the desired frequency band.

Coaxial electric devices, such as coaxial cables, coaxial connectors and coaxial switches, are well known in the art and are widely used to transmit electromagnetic signals between a source and a load. Coaxial electric devices are typically designed to transmit electromagnetic signals over 10 MHz with minimum loss and little or no distortion. As a result, coaxial electric devices are commonly used to transmit and receive signals used for broadcast, cellular phone, GSM, data and other uses.

A coaxial electric device typically comprises an inner signal conductor which serves to transmit the desired communication signal. The inner signal conductor is separated from an outer conductor by an insulating material, or dielectric material, the outer conductor serving as the return path, or ground, for the communication signal. The relationship of the diameters and the dielectric material properties of the components defines the characteristic impedance of the coaxial device. Such an electric device is referred to as coaxial because the inner and outer conductors share a common longitudinal axis.

It has been found that, on occasion, undesirable electromagnetic signals which fall outside of the desired frequency band are transmitted through coaxial electric devices. As an example, coaxial electric devices are susceptible to having naturally created, low frequency electromagnetic impulses (e.g., of the type produced by lightning) pass therethrough. As another example, coaxial electric devices are susceptible to having transient, large current, artificially created electromagnetic impulses (e.g., of the type produced by motors, switches and certain types of electrical circuits) pass therethrough.

As can be appreciated, the passing of undesirable electromagnetic signals through a coaxial electric device can potentially damage, or even destroy, the load which is connected to said coaxial electric device, which is highly undesirable.

As a result, it is well known in the art for coaxial electric devices to include some type of protective device for eliminating or deflecting these types of undesirable electromagnetic impulses before said impulses are transmitted to the load.

In U.S. Pat. No. 5,764,114 to G. Kühne, there is disclosed an electromagnetic pulse (EMP) filter which can be used simultaneously for a plurality of frequency bands which includes a housing mounted in the outer conductor and a $\lambda/4$ short-circuiting conductor, which is connected in an electrically conductive fashion to the inner conductor of a coaxial line and is connected in an electrically conductive fashion to the end face of a housing. Arranged between the housing and the short-circuiting conductor is at least one sleeve which is connected to the latter in an conductive fashion. The length of the short-circuiting line corresponds to the $\lambda/4$ length of the lowest frequency band transmitted. Considered together, the sleeves produce a number of cavity resonators which are connected in series and are tuned with their length to various midband frequencies. It is directly possible by means of such cavity resonators connected in series to transmit a plurality of frequency bands, and thus to protect terminals against damaging current surges of other frequencies not within these bands.

In U.S. Pat. No. 6,101,080 to G. Kühne, there is disclosed a de-coupled EMP-charge eliminator device in a co-axial cable. The device includes a conductor which connects to the internal conductor of the coaxial device and extends through a housing that is attached to the outer coaxial conductor. At the conductor end opposite the coaxial center conductor, there is a concentrated capacitance connected between the housing and conductor which becomes an RF short circuit, so that the conductor acts as a lambda/4 short circuit conductor. After this concentrated capacitance, an EMP charge eliminator device is connected from the conductor to the housing.

Although useful and well known in the art, coaxial electric devices of the type described above which comprise a protective device for filtering undesirable electromagnetic impulses traveling therethrough suffer from some notable drawbacks.

As a first drawback, coaxial electric devices of the type described above utilize a shunt conductor which is coupled to and extends orthogonally away from the inner conductor, the shunt conductor requiring a separate enclosure which extends out from the outer conductor at a right angle relative to the inner conductor, thereby significantly increasing the overall size of the device, increasing the manufacturing costs associated with manufacturing the device, and rendering the device difficult to mount onto certain enclosures, which is highly undesirable.

As a second drawback, a coaxial electric device of the type described in U.S. Pat. No. 6,101,080 utilizes a concentrated capacitor grounding component which is fragile and difficult to assemble, thereby increasing manufacturing costs, which is highly undesirable.

As a third drawback, it has been found to be relatively difficult to adjust the desired frequency band to be transmitted by the coaxial electric devices described above. In fact, in order to alter the desired frequency range to be transmitted through the central conductor, coaxial electric devices of the type described above require the manufacturer to use a multitude of different lengths of orthogonal housings and/or shunt components, which is highly undesirable.

As a fourth drawback, the multiple tube coaxial electric device described in U.S. Pat. No. 5,764,114 provides multiple resultant bands of operation which are too narrow for many applications. In addition, it has been found to be extremely difficult to simultaneously tune the multiple tubes in order to widen the performance of said device.

As a fifth drawback, each of the coaxial electric devices described above is provided with a single protective component which has a limited lifetime. As a result, the single protective component has been found, in time, to fail which, in turn, requires expensive replacement and/or repair, which is highly undesirable.

In U.S. Pat. No. 6,236,551 to J. Jones et al., there is disclosed a surge suppressor device for protecting hardware devices using a spiral inductor (hereinafter referred to as the Jones patent). The surge suppressor protects hardware devices from electric surges by isolating the radio frequency from an inner conductor. The surge suppressor includes a housing, an inner conductor, a surge blocking device, and a spiral inductor. The surge blocking device is inserted in series with the hardware devices for blocking the flow of electrical energy therethrough. The spiral inductor is coupled to the surge blocking device and is shunted to ground for discharging the electrical surge.

Although useful and well known in the art, surge suppressor devices of the type described in the Jones patent suffer from a couple notable drawbacks.

As a first drawback, surge suppressor devices of the type described in the Jones patent have significant geometry changes on the length of the center pin, notably the large diameter increase for the surge blocking discs and the spiral inductor. These large changes in the center pin RF impedance must be compensated for in the ID of the outer housing. Thus changing frequency requires re-tuning of the compensation geometry, which is relatively difficult.

Another more serious drawback is that the non-constant impedance of the center conductor makes use of compensated quarter wave principles, for predictable wide-band performance, difficult or impossible.

In U.S. Pat. No. 5,982,602 to R. L. Tellas et al., there is disclosed a surge protector connector (hereinafter referred to as the Tellas patent). The surge protector connector comprises a surge protector having a front plate, a rear plate and a hollow cylindrical body bridging the front and rear plates. A coaxial cable connector interface extends from the front plate, the connector interface being constructed and arranged to detachably engage with a mating coaxial cable connector at the end of a first coaxial cable. A cable attachment interface extends from the rear plate, the cable attachment interface being constructed and arranged to attach directly to a prepared end of a second coaxial cable free of another coaxial cable connector interface. The surge protector further includes coaxial inner and outer conductors extending through the hollow cylindrical body and extending between the cable attachment interface and the coaxial cable connector interface. The surge protector includes a curvlinear quarter-wavelength shorting stub having a first portion extending in a generally radial direction from the inner conductor through a gap in the outer conductor and a second portion extending in a generally annular direction circumscribing the outer conductor between the outer conductor and the cylindrical body.

Although useful and well known in the art, surge protector connectors of the type described in the Tellas patent suffer from a couple notable drawbacks.

As a first drawback, surge protector connectors of the type described in the Tellas do not readily allow for adjusting bandwidth frequency performance.

As a second drawback, surge protector connectors of the type described in Tellas which include a curvlinear shorting stub often experience problems due to the considerably sharp bend at the juncture between the radially extending first portion and the annularly extending second portion. Specifically, the initial radial direction of the first portion results in a smaller bend radius at the transition with the second circumferential portion. This smaller bend radius increases the forces of high current transients which, in turn, can deform or break the shorting stub, which is highly undesirable.

As a third drawback, surge protector connectors of the type described in Tellas include an outer conductor which includes a relatively large sized gap through which the shorting stub extends. As can be appreciated, the large size of the gap in the outer conductor limits the optimization of the outer conductor for RF performance or transient impulse application, which is highly undesirable.

As a fourth drawback, surge protector connectors of the type described in Tellas which include a shorting stub which is directly connected to the outer conductor do not allow for the pass-through of direct current voltage on the center conductor.

SUMMARY OF THE INVENTION

It is an object of the present invention to provide a new and improved device for transmitting electromagnetic signals of a desired frequency band from a source to a load.

It is another object of the present invention to provide a device as described above which allows for the desired frequency band to be easily adjusted.

It is yet another object of the present invention to provide a device as described above which optimally and predictably reduces electromagnetic energy which falls outside of the desired frequency band instead of conducting said energy to the load.

It is still another object of the present invention to provide a device as described above which comprises an outer conductor and an inner conductor extending coaxially within the outer conductor.

It is yet still another object of the present invention to provide a device as described above which is limited in size and which includes a limited number of parts.

It is another object of the present invention to provide a device as described above which is inexpensive to manufacture in a variety of configurations.

It is yet another object of the present invention to provide a device as described above which includes a shunt conductor which is connected to the inner conductor and is capacitively connected to the outer conductor.

It is another object of the present invention to provide a device as described above which has a relatively long service lifetime.

It is still another object of the present invention to provide a device as described above which allows direct current voltage to pass therethrough.

Accordingly, there is provided a voltage protective device comprising (a) a first conductor, (b) a second conductor spaced apart from the first conductor, and (c) a plurality of gas discharge tubes coupled in parallel between the first and second conductors.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration particular embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate particular embodiments of the invention and, together with the description, serve to explain the principles of the invention. In the drawings wherein like reference numerals represent like parts:

FIG. 4(*b*) is a section view of the RFIC tube shown in FIG. 4(*a*) taken along lines 4(*b*)-4(*b*);

DETAILED DESCRIPTION OF A PREFERRED EMBODIMENT

Figure 1:
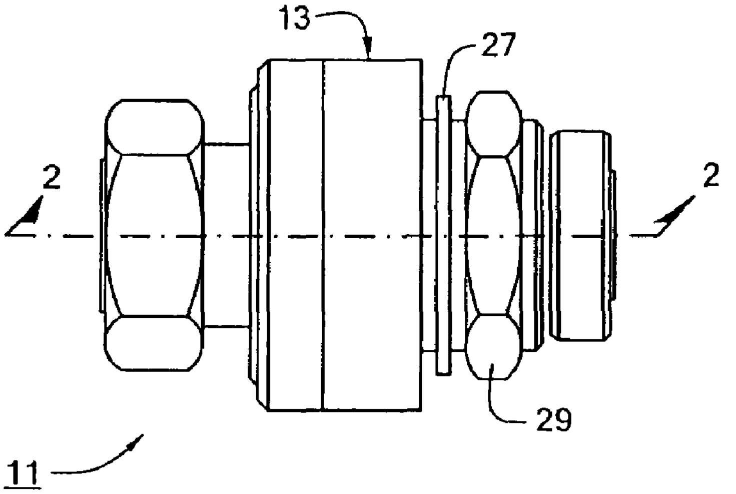
FIG. 1 is a front plan view of a first embodiment of a protective device constructed according to the teachings of the present invention.
Figure 2:
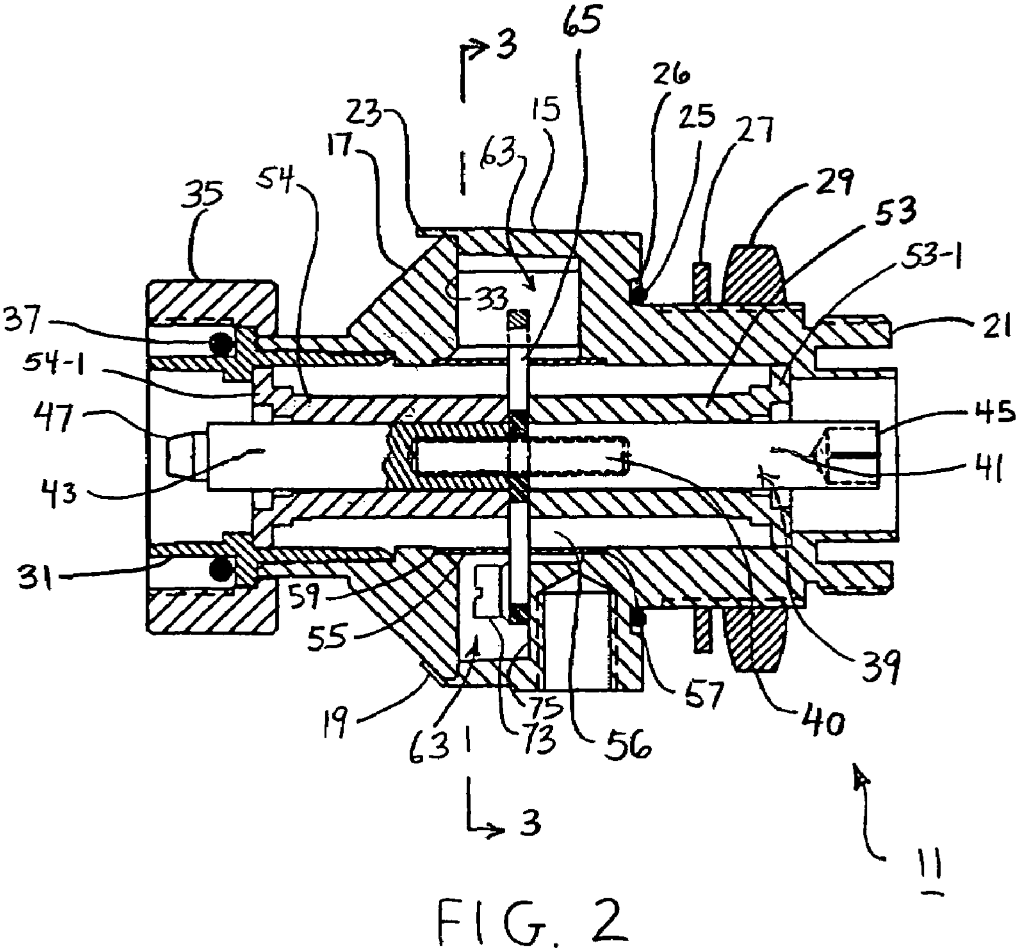
FIG. 2 is a section view of the protective device shown in FIG. 1, taken along lines 2-2, the second elongated member of said protective device being shown broken away in part.
Figure 3:
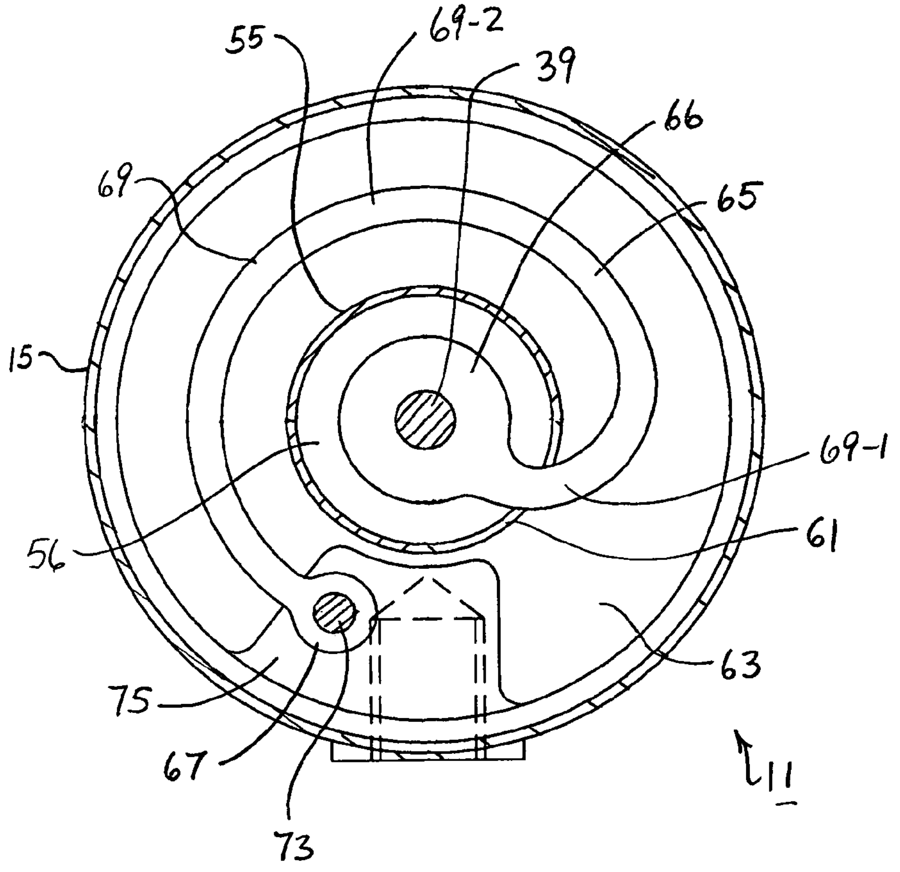
FIG. 3 is a section view of the protective device shown in FIG. 2, taken along lines 3-3, the protective device being shown with the end plug removed therefrom.

Referring now to FIGS. 1-3, there is shown a first embodiment of a protective device for transmitting electromagnetic signals of a desired frequency band from a source to a load, said protective device being constructed according to the teachings of the present invention and represented generally by reference numeral 11. As will be described further in detail below, protective device 11 is designed to prevent electromagnetic signals which fall outside of the desired frequency band from being transmitted to the load.

Protective device 11 can be used to transmit electromagnetic signals with a typical center frequency of 0.8 to over 6.0 GHz and a typical bandwidth of 5%-25% of said center frequency. As a result, protective device 11 can be used in a multitude of different applications, such as radio frequency (RF) pagers, AM/FM radio broadcast transmission, cellular, GSM and UMTS bands.

Protective device 11 comprises an outer conductor 13 which is constructed of a rigid, durable and conductive material, such as brass.

As seen most clearly in FIG. 2, outer conductor 13 has an annular shape in lateral cross-section with an intermediate portion of expanded diameter. Outer conductor 13 comprises a main body portion 15 and a body cover 17 which are telescopingly mounted together. Specifically, the outer surface of body cover 17 is sized and shaped to frictionally engage the inner surface of main body portion 15. Preferably, a seal is provided within the area of contact between main body portion 15 and body cover 17 to ensure water tight integrity. With body cover 17 press fit onto main body portion 15, main body portion 15 and body cover 17 may be mechanically crimped together, as represented by reference numeral 19 in FIG. 2, to secure body cover 17 onto main body portion 15.

It is to be understood that outer conductor 13 is not limited to the two-piece construction described herein. Rather, it is to be understood that outer conductor 13 could have an alternative construction (e.g., a single or multiple piece construction) without departing from the spirit of the present invention.

Main body portion 15 is generally cylindrical in shape and includes a first end 21 and a second end 23, the inner surface diameter of main body portion 15 at first end 21 being less than the inner surface diameter of main body portion 15 at second end 23.

First end 21 of main body portion 15 is shaped in the form of a female electrical connector which is threaded on its outer surface, thereby enabling first end 21 of main body portion 15 to be easily coupled to the electromagnetic signals passing through protective device 11. An O-ring, or gasket, 25 is seated in a recess 26 formed in the outer surface of main body portion 15. In addition, a lock washer 27 and a hex nut 29 are threadingly mounted onto the outer surface of main body portion 15. As can be appreciated, gasket 25, washer 27 and nut 29 together ensure adequate connectivity and sealing between first end 21 and the enclosure onto which the device is mounted.

Body cover 17 includes a first end 31 and a second end 33, the outer surface diameter of body cover 17 at first end 31 being less than the outer surface diameter of body cover 17 at second end 33.

First end 31 of body cover 17 is shaped in the form of a male electrical connector. Specifically, first end 31 is in the form of a ferrule which can be inserted into and conductively coupled to the transmitted electromagnetic signals passing through device 11. A coupling nut 35 having a threaded inner surface is slidably mounted onto body cover 17 proximate first end 31. An O-ring, or gasket, 37 is disposed between coupling nut 35 and first end 31. As can be appreciated, gasket 37 and coupling nut 35 together ensure adequate connectivity and sealing between first end 31 and the mating connector of the attaching cable.

An inner conductor 39 is disposed along the longitudinal axis of outer conductor 13, inner conductor 39 being spaced apart and isolated from outer conductor 13. Inner conductor 39 is preferably constructed of a bronze or copper alloy and extends coaxially along nearly the entire length of outer conductor 13.

It should be noted that protective device 11 is represented herein as being in the form of a coaxial device. However, it is to be understood that protective device 11 is not limited to a coaxial configuration. Rather, it is to be understood that protective device 11 could be in the form of alternative signal transmission devices, such as a signal transmission device comprising two or more inner conductors, without departing from the spirit of the present invention.

Inner conductor 39 includes a central threaded pin 40 of limited length. A first elongated member 41 is coaxially threaded onto one end of pin 40. First elongated member 41 includes a female pin, or connector, 45 at one end which is sized and shaped to receive a corresponding male pin on the mating connector. As such, together female pin 45 and first end 21 of outer conductor 13 form a female coaxial connector interface which can be directly connected to the corresponding male interface of the transmission line.

A second elongated member 43 is coaxially threaded onto the other end of pin 40. Second elongated member 43 includes a male pin, or connector, 47 at one end which is sized and shaped to fit within a corresponding female pin on the mating connector. As such, together male pin 47 and first end 31 of outer conductor 13 form a male coaxial connector interface which can be directly connected to the corresponding female interface of the transmission signal load.

It should be noted that the first end of a shunt conductor 65 (which will be described further in detail below) is slidably mounted onto pin 40 in wedged contact between members 41 and 43. Accordingly, members 39 and 41 as well as shunt conductor 65 are all compressed, or jammed, together to form the elongated inner conductor 39. It should be noted that, because all of said components are constructed of a conductive material, such as brass, said components create the continuous electrical continuity which is required to form inner conductor 39.

A first annularly-shaped insulator 53 is mounted onto first elongated member 41 between female pin 45 and shunt conductor 45. Similarly, a second annularly-shaped insulator 54 is mounted onto second elongated member 43 between male pin 47 and shunt conductor 65. Together, insulators 53 and 54 serve to mechanically support inner conductor 39 and electrically insulate inner conductor 39 from outer conductor 13, insulators 53 and 54 being constructed of any conventional insulated material, such as Teflon® (PTFE).

It should be noted that insulator 53 has a stepped-shaped configuration at end 53-1 proximate female pin 45. Similarly, insulator 54 has a stepped-shaped configuration at end 54-1 proximate male pin 47. As can be appreciated, the impedance desired for inner conductor 39 can be regulated by modifying the particular configuration of high dielectric constant insulators 53 and 54. In the present embodiment, insulators 53 and 54 define regions of air or other similar types of low dielectric constant material between inner conductor 39 and outer conductor 15 to attain a nominal transmission line impedance (usually 50 or 75 ohms). Stated another way, regions of low dielectric constant material can be introduced between inner conductor 39 and outer conductor 15 to lower the nominal impedance most easily by removing portions of the higher dielectric constant insulators 53 and 54 (i.e., by creating air-filled holes, grooves or other voids in the higher dielectric constant material). In further embodiments, the insulators are configured such that the aforementioned regions of air are either removed entirely or filled with higher dielectric constant material to reduce the line impedance to values lower than nominal, which is highly desirable.

A radio frequency impedance control (RFIC) tube 55 is disposed between inner conductor 39 and outer conductor 13. RFIC tube 55 is in the form of a sleeve which is wrapped around inner conductor 39 to help maintain the proper longitudinal RF impedance and transmission line characteristics for protective device 11.

RFIC tube 55 is generally cylindrical in shape and is constructed of a rigid conductive material. RFIC tube 55 is disposed in a concentric manner around inner conductor 39, as seen most clearly in FIG. 3. It should be noted that RFIC tube 55 is spaced adequately away from inner conductor 39, the inner diameter of RFIC tube 55 being spaced apart from inner conductor 39 by a dielectric medium 56 which is shown herein to be in the form of an air pocket.

Figure 4B:
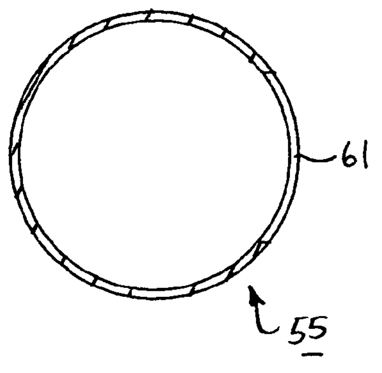
FIG. 4(*a*) is a front plan view of the RFIC tube shown in FIG. 3.
Figure 4A:
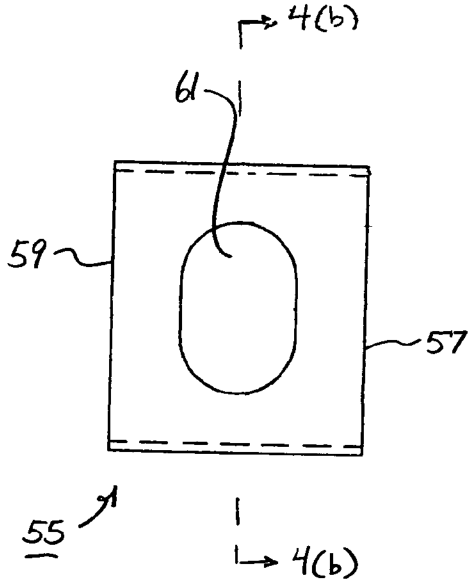

As seen most clearly in FIGS. 4(*a*) and 4(*b*), RFIC tube 55 includes a first end 57 which is in direct contact with the inner surface of main body portion 15. RFIC tube 55 also comprises a second end 59 which is in direct contact with the inner surface of body cover 17. RFIC tube 55 is additionally shaped to define an opening 61 which is sized and shaped to enable shunt conductor 65 to pass therethrough, as will be described further in detail below.

Opening 61 is preferably in the form of an oval-shaped slot wherein the long dimension of the slot extends substantially perpendicular to the longitudinal axis of RFIC tube 55. It should be noted that the size of opening 61 is preferably large enough to allow shunt conductor 65 (which may, on occasion, experience some deformation) to pass therethrough and small enough to minimize the disturbance to the transmission line for device 11, which is highly desirable.

Accordingly, with regard to the impedance of inner conductor 39, the outer diameter of inner conductor 39 and the inner diameter of outer conductor 13, in conjunction with the configuration and dielectric properties of insulator 53 define a characteristic impedance of the portion of inner conductor 39 corresponding to the length of insulator 53 which is approximately the value of the characteristic impedance of the transmission system (e.g., usually 50 or 75 ohms).

In addition, the outer diameter of inner conductor 39 and the inner diameter of outer conductor 13, in conjunction with the configuration and dielectric properties of insulator 54 define a characteristic impedance of the portion of inner conductor 39 corresponding to the length of insulator 54 which is approximately the value of the characteristic impedance of the transmission system (e.g., usually 50 or 75 ohms).

Furthermore, the outer diameter of inner conductor 39 and the inner diameter of RFIC tube 55, in conjunction with the dielectric properties of dielectric medium 56 (i.e., air ) define a characteristic impedance of the portion of inner conductor 39 corresponding to the length of RFIC tube 55 which is approximately the value of the characteristic impedance of the transmission system (e.g., usually 50 or 75 ohms).

It should be noted that the outer surface of RFIC tube 55, the inner surface of body cover 17 and the inner surface of main body portion 15 together define an annularly shaped cavity, or volume region, 63 which wraps around the middle of RFIC tube 55, as seen most clearly in FIG. 2. As will be described further below, cavity 63 is sized and shaped to receive a portion of shunt conductor 65 which protrudes out from inner conductor 39.

RFIC tube 55 provides three significant functions. First, RFIC tube 55 helps to maintain the longitudinal throughput impedance between center conductor 39 and the inner surface of RFIC tube 55. Second, RFIC tube 55 helps to define cavity 63 into which shunt conductor 65 projects. Third, annular cavity 63 which is partially defined RFIC tube 55 establishes an impedance for shunt conductor 65 by which shunt conductor 65 can operate as a quarter-wavelength stub. As a result, RFIC tube 55 enables protective device 11 to be a more compact and lower cost unit with better RF performance, which is highly desirable.

Figure 5:
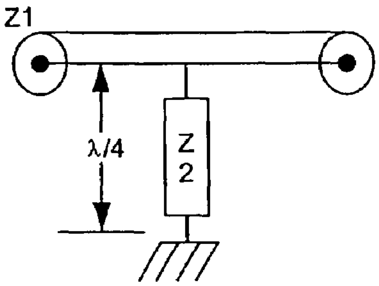
FIG. 5 is a simple schematic representation of the protective device shown in FIG. 1.
Figure 6:
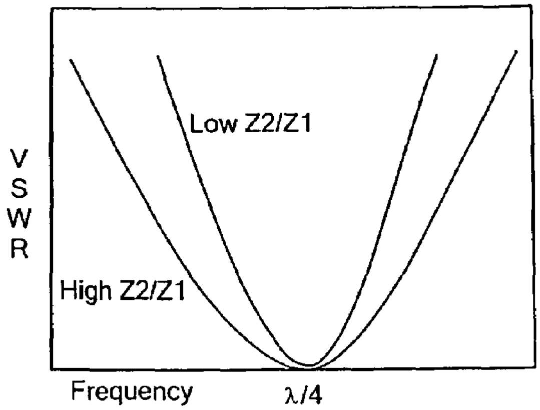
FIG. 6 is a performance chart for the protective device shown in FIG. 1 depicting the virtual standing wave ratio (VSWR) as a function of frequency.

Protective device 11 experiences narrow bandwidth properties and defines a longitudinal characteristic impedance which is approximately the value of the characteristic impedance of the transmission system. FIG. 5 shows a simple schematic representation of protective device 11, wherein Z2 represents the impedance of shunt conductor 65 and Z1 represents the characteristic impedance of the transmission system. FIG. 6 shows a performance chart for protective device 11 in which the voltage standing wave ratio (VSWR) is depicted as a function of frequency. As can be appreciated, the VSWR approaches zero as the frequency reaches ¼ of the transmission wavelength, wherein a higher Z2/Z1 ratio produces a wider operational bandwidth than a lower Z2/Z1 ratio.

As noted briefly above, shunt conductor 65 connects inner conductor 39 with outer conductor 13. Shunt conductor 65 functions as an inductor for filtering out from transmission line 39 those electromagnetic pulse signals which fall outside of the desired frequency band (e.g., naturally created, low frequency electromagnetic impulses, such as lightning, and transient, large current, artificially created electromagnetic impulses, such as of the type produced by motors, switches and certain electrical circuits). Specifically, shunt conductor 65 has a length which is one quarter of the wavelength of the desired frequency band. As a result, shunt conductor 65 functions as an open circuit when signals falling within the desired RF band travel through transmission line 39. As can be seen in FIG. 6, shunt conductor 65 also functions as a closed, or short, circuit when signals falling outside of the desired RF band travel through transmission line 39, shunt conductor 65 thereby shunting said undesirable frequencies to outer conductor 13 to protect the load, which is highly desirable.

As seen most clearly in FIG. 3, shunt conductor 65 is constructed of a conductive material, such as copper, and comprises a first end 66, a second end 67 and an intermediary portion 69 which connects first end 66 to second end 67. Intermediary portion 69 is a unitary member which includes a first curved section 69-1 and a second curved section 69-2. Each of first and second curved sections 69-1 and 69-2 extends along an arcuate path which has a fixed radius, with the radius of curved section 69-2 being approximately twice the length of the radius of curved section 69-1. It should be noted that the particular multi-curved configuration of intermediary portion 69 limits the deformation of shunt conductor 65 from transient currents, thereby reducing the possibility of shunt conductor 65 becoming damaged from transient currents.

First curved section 69-1 extends out from inner conductor 39, passes through opening 61 in RFIC tube 55 and projects into cavity 63. Second curved section 69-2 then extends in a circumferential path within cavity 63 in a concentric manner between RFIC tube 55 and outer conductor 13. Second end 67 of shunt conductor 65 is grounded connected to outer conductor 13 by a fastening device 73, such as a screw.

It should be noted that second end 67 of shunt conductor 65 is connected to a raised platform 75 formed onto main body portion 15. As such, the entire length of intermediary portion 69 of shunt conductor 65 is spaced adequately away from RFIC tube 55, as seen most clearly in FIG. 3, and outer conductor 13, as seen most clearly in FIG. 2.

Although shunt conductor 65 is represented in FIG. 3 as being bent, or curved, approximately 300 degrees along a single plane, it is to be understood that the particular size, shape and configuration of shunt conductor 65 could be modified without departing from the spirit of the present invention. In particular, it should be noted that the specific length of shunt conductor 65 can be changed by modifying its size, shape and/or configuration. As can be appreciated, altering the particular length of inductive shunt conductor 65 determines the center frequency that is desired to be passed through center conductor 39. Specifically, a longer length shunt conductor of approximately 26 inches will permit the transmission of lower frequency energy of approximately 100 MHz though inner conductor 39. Similarly, a shorter length shunt conductor of approximately 1.5 inches will permit the transmission of higher frequency energy of approximately 1500 MHz through inner conductor 39. It should be noted that it is relatively easy to build devices with shunt conductors of different lengths. As such, protective device 11 allows for the simple regulation of the operational frequency of device 11 by changing only one component (i.e., the shunt conductor), which is highly desirable.

Figure 7:
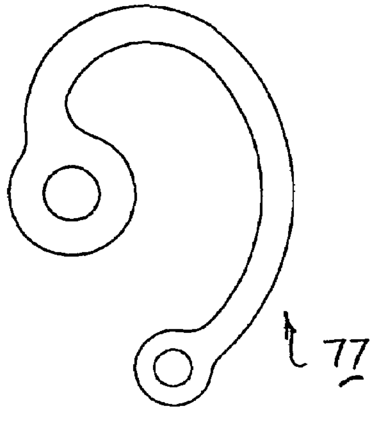
FIG. 7 is a top plan view of a modification of the stub shown in FIG. 3.
Figure 8:
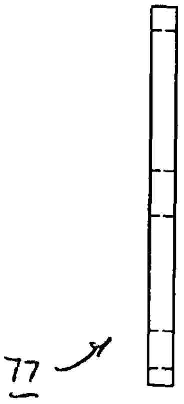
FIG. 8 is a left side view of the stub shown in FIG. 7.

As an example, referring now to FIGS. 7 and 8, there is shown another embodiment of a shunt conductor which can be used in the protective device of the present invention, the shunt conductor being identified by reference numeral 77. Shunt conductor 77 differs from shunt conductor 65 in that shunt conductor 77 is bent, or curved, approximately 165 degrees whereas shunt conductor 65 is bent, or curved, approximately 300 degrees. Because shunt conductor 77 is significantly shorter in length than shunt conductor 65, shunt conductor 77 could be used to transmit higher frequency energy through inner conductor 39 than shunt conductor 65.

Figure 9:
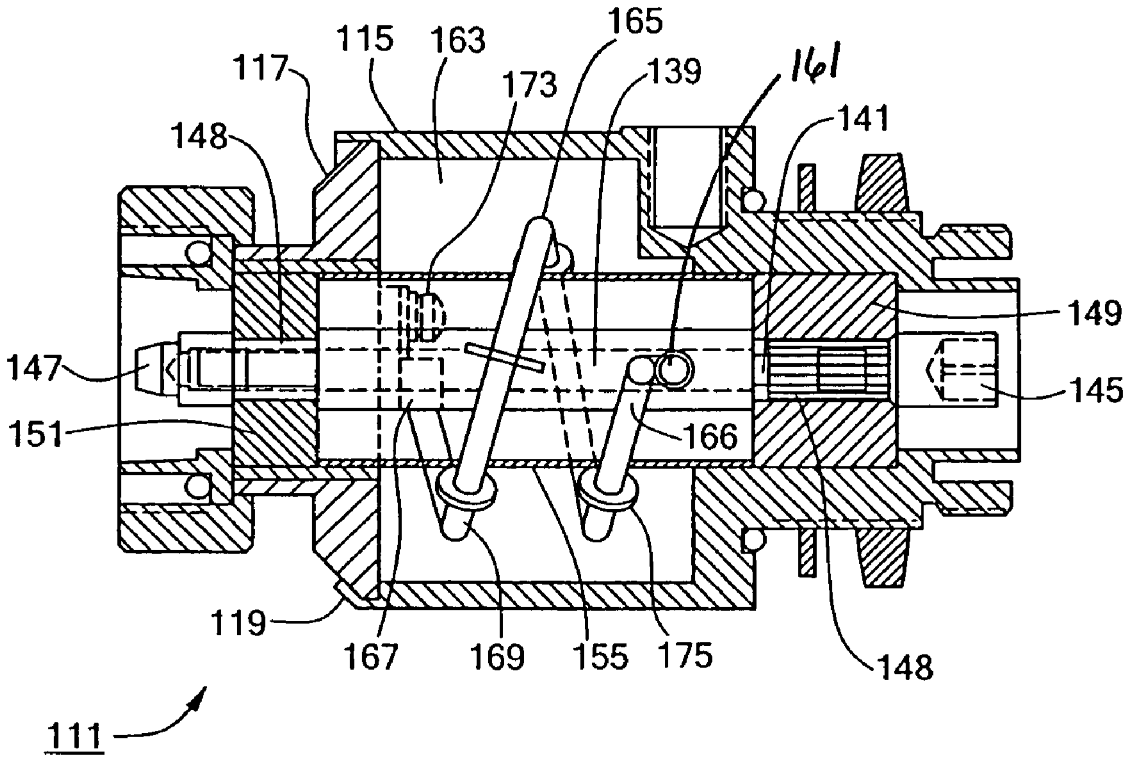
FIG. 9 is a section view of a second embodiment of a protective device constructed according to the teachings of the present invention.

As another example, shunt conductor 65 could be reconfigured into a multi-planar coil, or helix, thereby significantly increasing its overall length without significantly increasing the overall diameter of protective device 11. As such, configuring shunt conductor 65 into a multi-planar coil would allow for the transmission of significantly lower frequencies (typically below approximately 1 GHz). Referring now to FIG. 9, there is shown a second embodiment of a protective device constructed according to the teachings of the present invention, the protective device being represented generally by reference numeral 111.

The principal distinction between protective device 111 and protective device 11 is that protective device 111 comprises a shunt conductor which is configured into a multi-planar coil, whereas shunt conductor 65 in protective device 11 is configured into a planar curve, as will be described further in detail below.

Protective device 111 is similar in construction in most respects with protective device 11. Specifically, protective device 111 comprises an outer conductor 113 which is constructed of a rigid, durable and conductive material, such as brass, and an inner conductor 139 disposed along the longitudinal axis of outer conductor 113. Inner conductor 139 comprises an elongated bolt-type member 141 which includes a female pin, or connector, 145 at one of its ends, a male pin, or connector, 147 mounted onto member 141, and a plurality of sleeves 148 mounted onto member 141 between female pin 145 and male pin 147. Together, member 141, male connector 147 and sleeves 148 are all inwardly urged into contact with each other so as to create the continuous electrical continuity for inner conductor 139.

A pair of spaced apart, annularly-shaped insulators 149 and 151 mechanically support inner conductor 139 and electrically insulate sleeves 148 from outer conductor 113, insulators 149 and 151 being constructed of any conventional insulated material, such as TEFLON® (PTFE).

A radio frequency impedance control (RFIC) tube 155 is disposed between inner conductor 139 and outer conductor 113. RFIC tube 155 is in the form of an elongated, cylindrical sleeve which is wrapped around inner conductor 139 to help maintain the proper longitudinal RF impedance and transmission line characteristics for protective device 111.

RFIC tube 155 includes a first end 157, which is in direct contact with the inner surface of main body portion 115 and insulator 149, and a second end 159, which is in direct contact with the inner surface of body cover 117 and insulator 151. RFIC tube 155 is additionally shaped to define include an opening 161 which is sized and shaped to enable a shunt conductor to pass therethrough.

It should be noted that the outer surface of RFIC tube 155, the inner surface of body cover 117 and the inner surface of main body portion 115 together define an annularly shaped cavity, or volume region, 163 which wraps around the majority of the length of RFIC tube 155.

A shunt conductor 165 connects inner conductor 139 with outer conductor 113. Shunt conductor 165 is constructed of a conductive material, such as copper, and comprises a first end 166, a second end 167 and a coiled intermediary portion 169 which connects first end 166 to second end 167. First end 166 is connected to inner conductor 139. Intermediary portion 169 of shunt conductor 165 extends radially out from inner conductor 139, passes through opening 161 in RFIC tube 155 and projects into cavity 163. Intermediary portion 169 then helically coils around RFIC tube 155. Second end 167 of shunt conductor 165 is grounded connected to outer conductor 113 by a screw 173.

It should be noted that, due to its coiled configuration, shunt conductor 165 is able to accommodate a relatively long length without significantly increasing the overall size of device 111, which is highly desirable.

It should also be noted that it is important for the coiled intermediate portion 169 of shunt conductor 165 to be adequately insulated from and spaced between RFIC tube 155 and/or outer conductor 113. It should also be noted that it is important for the successive coils of intermediate portion 169 of shunt conductor 165 to be adequately insulated from one another. As such, a plurality of insulated disks, or washers, 175 are mounted onto intermediate portion 169 to prevent contact between shunt conductor 165 and RFIC tube 155 as well as to prevent contact between the successive coils of shunt conductor 165. However, it should be noted that the insulation devices are not limited to washers 175. Rather, it is to be understood that intermediate portion 169 of shunt conductor 165 could alternatively be shrink wrapped with an insulator or held in place with another suitable material without departing from the spirit of the present invention.

Figure 10:
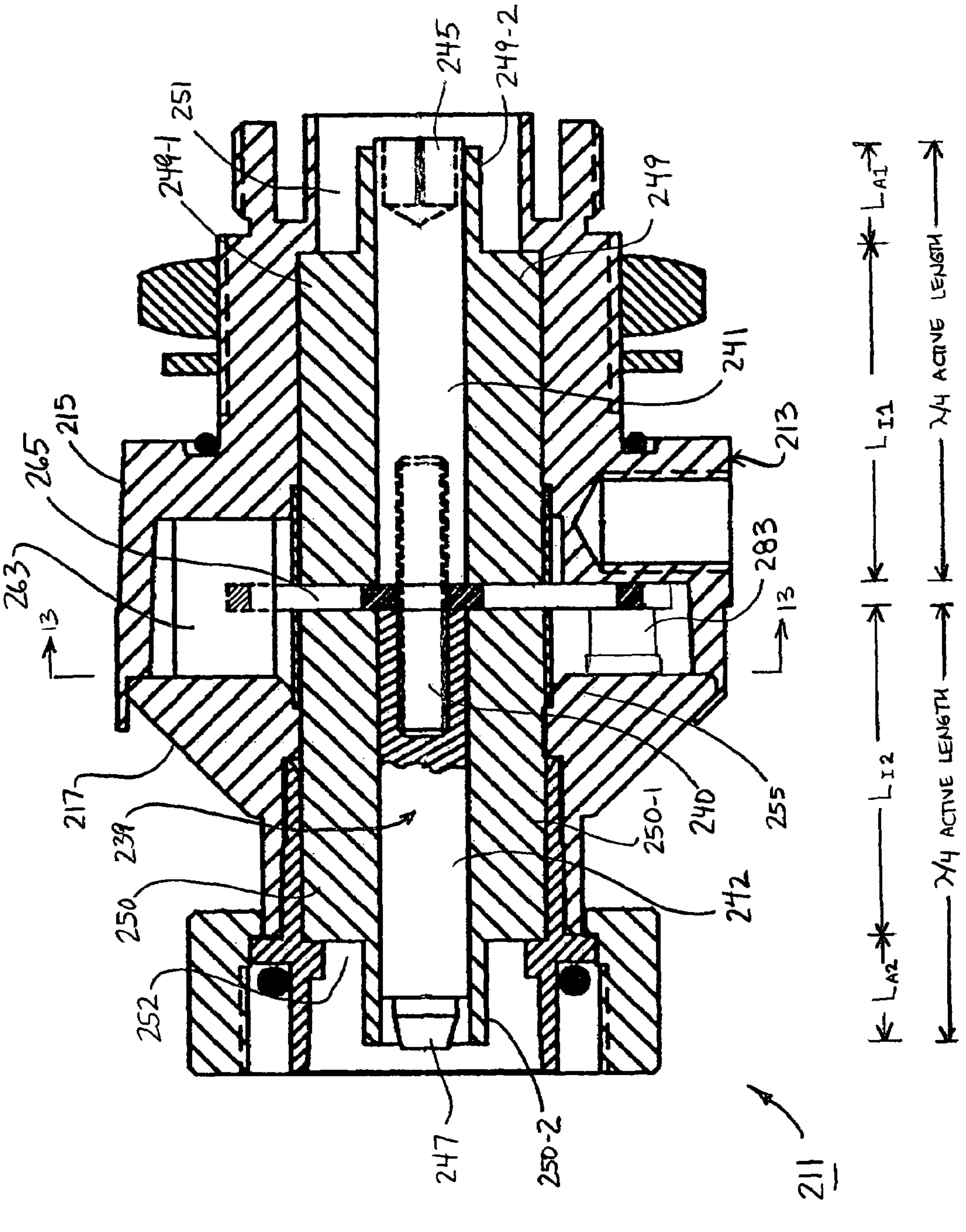
FIG. 10 is a section view of a third embodiment of a protective device constructed according to the teachings of the present invention, the second elongated member of said protective device being shown broken away in part.

Referring now to FIG. 10, there is shown a third embodiment of a protective device constructed according to the teachings of the present invention, the protective device being represented generally by reference numeral 211.

One of the principal distinctions between protective device 211 and protective device 11 is that protective device 211 operates as a compensated, or wide-band, quarter-wave device through the addition of longitudinal RF transformers whereas protective device 11 operates as an uncompensated, or narrow-band, quarter-wave device, as will be described further in detail below.

Protective device 211 is similar in construction in most respects with protective device 11. Specifically, protective device 211 comprises an outer conductor 213 which is constructed of a rigid, durable and conductive material, such as brass. Outer conductor 213 is similar to outer conductor 13 in that outer conductor 213 has a generally annular shape in lateral cross-section with an intermediate portion of expanded diameter. Outer conductor 213 comprises a main body portion 215 and a body cover 217 which are telescopingly mounted together. Specifically, the outer surface of body cover 217 is sized and shaped to frictionally engage the inner surface of main body portion 215. Preferably, a conventional sealant is provided within the area of contact between main body portion 215 and body cover 217 to ensure adequate water-tight integrity along the length of outer conductor 213.

An inner conductor 239 is disposed along the longitudinal axis of outer conductor 213. Inner conductor 239 includes a central threaded pin 240 of limited length. A first elongated member 241 is coaxially threaded onto one end of pin 240 and a second elongated member 242 is coaxially threaded onto the other end of pin 240. The free end of first elongated member 241 is generally in the form of a female pin, or connector, 245. The free end of second elongated member 242 is generally in the form of a male pin, or connector 247.

The annular first end of a shunt 265 is slidably mounted onto cylindrical pin 240 in frictional engagement therewith, the annular first end of shunt 265 being sandwiched between first and second elongated members 241 and 242. As such, first elongated member 241, second elongated member 242 and shunt 265 are all drawn in contact with one another so as to provide the electrical continuity for inner conductor 239. It should be noted that first elongated member 241 and second elongated member 242 have constant and equal cross-sectional diameters, thereby providing inner conductor 239 with symmetry along the majority of its length, which is highly desirable.

An insulator 249 serves to mechanically support and electrically insulate first elongated member 241 from outer conductor 213, insulator 249 being constructed of any conventional insulated material, such as TEFLON® (PTFE). Insulator 249 is a unitary member which includes an annularly-shaped portion 249-1 of considerable thickness and an annularly-shaped portion 249-2 of reduced thickness.

Portion 249-1 of insulator 249 is mounted onto (i.e., wrapped around) the majority of first elongated member 241 in direct contact between member 241 and outer conductor 213. Portion 249-2 of insulator 249 is mounted onto (i.e., wrapped around) the free end of first elongated member 241. Due to the thin construction of portion 249-2, a first annular dielectric medium 251 is formed between projection 249-1 and outer conductor 213, dielectric medium 251 being shown herein as being in the form of an air pocket which is formed because the inside diameter of outer conductor 213 is approximately 2.2 through 2.5 times the outside diameter of center conductor 239. First portion 249-1 has an active length $L_{T1}$ and second portion 249-2 has an active length $L_{A1}$. Accordingly, the entire length of insulator 249 forms an active length which is ¼ of the wavelength of the desired frequency band.

A second annularly-shaped insulator 250 serves to mechanically support and electrically insulate second elongated member 242 from outer conductor 213, insulator 250 being constructed of any conventional insulated material, such as TEFLON® (PTFE). Insulator 250 is a unitary member which includes an annularly-shaped portion 250-1 of considerable thickness and an annularly-shaped portion 250-2 of reduced thickness.

Portion 250-1 of insulator 250 is mounted onto (i.e., wrapped around) the majority of second elongated member 242 in direct contact between member 242 and outer conductor 213. Portion 250-2 of insulator 250 is mounted onto (i.e., wrapped around) the free end of second elongated member 250. Due to the thin construction of portion 250-2, a second annular dielectric medium 252 is formed between projection 250-1 and outer conductor 213, dielectric medium 252 being shown herein in the form of an air pocket. First portion 250-1 has an active length $L_{I2}$ and second portion 250-2 has an active length $L_{A2}$. Accordingly, the entire length of insulator 250 forms an active length which is ¼ of the wavelength of the desired frequency band.

A radio frequency impedance control (RFIC) tube 255 is disposed between inner conductor 239 and outer conductor 213. RFIC tube 255 is in the form of an elongated, cylindrical sleeve which includes a slot 261 along its length, RFIC tube 255 being wrapped insulators 249 and 250 to help maintain the proper longitudinal RF impedance and transmission line characteristics for protective device 211.

Specifically, with regard to the longitudinal characteristic impedance of inner conductor 239, the outer diameter of first elongated member 241, the inner diameter of outer conductor 213, RFIC tube 255 and body cover 215, in conjunction with the dielectric properties of insulator 249 define a longitudinal characteristic impedance for the portion of inner conductor 239 corresponding to active length $L_{I1}$ of insulator 249 which is lower than (e.g., 41 ohms), or otherwise unequal to, the value of the nominal characteristic impedance of the transmission system (e.g., usually 50 or 75 ohms).

Also, with regard to the longitudinal characteristic impedance of inner conductor 239, second elongated member 242, the inner diameter of outer conductor 213, RFIC tube 255 and body cover 217, in conjunction with the dielectric properties of insulator 250 define a longitudinal characteristic impedance for the portion of inner conductor 239 corresponding to active length $L_{I2}$ of insulator 250 which is lower than (e.g., 41 ohms), or otherwise unequal to, the value of the nominal characteristic impedance of the transmission system (e.g., usually 50 or 75 ohms).

In addition, with regard to the longitudinal characteristic impedance of inner conductor 239, the outer diameter of portion 249-1 of insulator 249 and the inner diameter of outer conductor 213, in conjunction with the dielectric properties of dielectric medium, or air gap, 251 define a longitudinal characteristic impedance for the portion of inner conductor 239 corresponding to active length $L_{A1}$ which is lower than (e.g., 41 ohms), or otherwise unequal to, the value of the nominal characteristic impedance of the transmission system (e.g., usually 50 or 75 ohms).

Furthermore, with regard to the longitudinal characteristic impedance of inner conductor 239, the outer diameter of portion 250-2 of insulator 250 and the inner diameter of outer conductor 213, in conjunction with the dielectric properties of dielectric medium, or air gap, 252 define a longitudinal characteristic impedance for the portion of inner conductor 239 corresponding to active length $L_{A2}$ which is lower than (e.g., 41 ohms), or otherwise unequal to, the value of the nominal characteristic impedance of the transmission system (e.g., usually 50 or 75 ohms).

Figure 11:
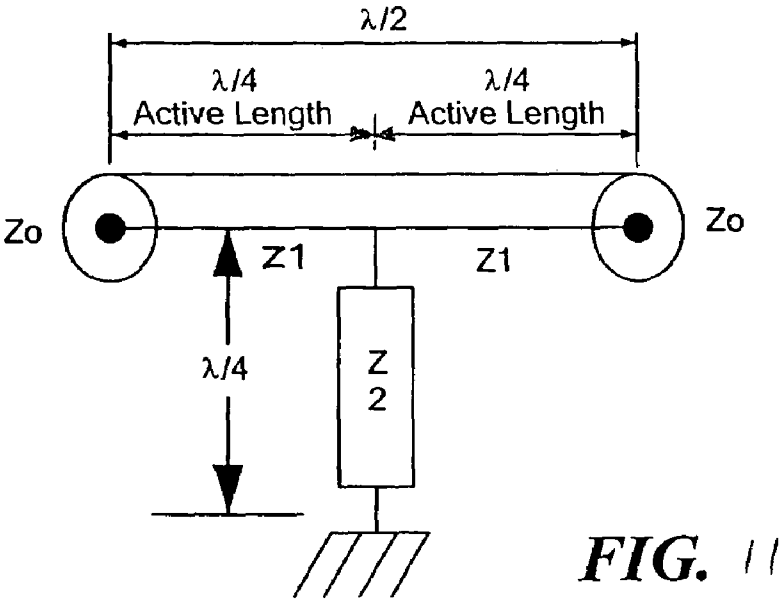
FIG. 11 is a simple schematic representation of the protective device shown in FIG. 10.

Protective device 211 experiences wide bandwidth properties and defines a longitudinal characteristic impedance which has a value (e.g., 41 ohms) which is less than the value of the nominal characteristic impedance for the transmission system. FIG. 11 shows a simple schematic representation of protective device 211, wherein Z0 represents the nominal characteristic impedance of for the transmission system, Z1 represents the longitudinal characteristic impedance for inner conductor 239 and Z2 represents the characteristic impedance of shunt 265. More complete models of wide-band quarter-wave shunt conductors are well-known in the art.

Figure 12:
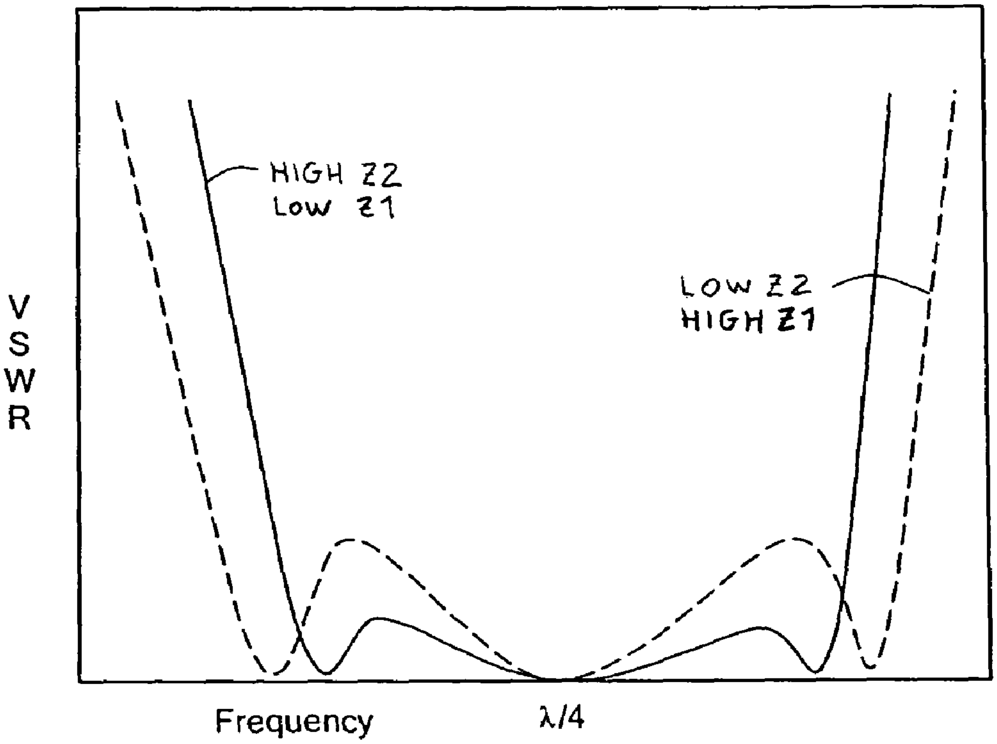
FIG. 12 is a performance chart for the protective device shown in FIG. 10 depicting the voltage standing wave ratio (VSWR) as a function of frequency.
Figure 14:
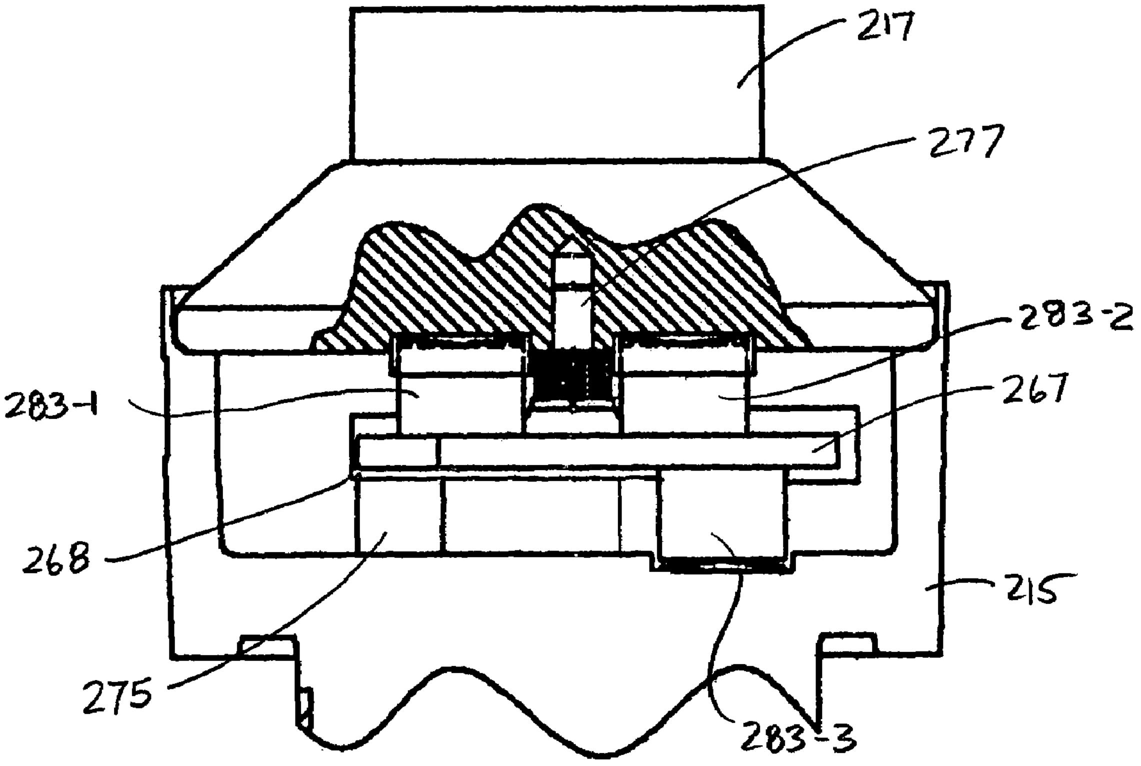
FIG. 14 is a front plan view of the protective device shown in FIG. 10, a portion of the outer conductor being shown broken away in part.

FIG. 12 shows a performance chart for protective device 211 in which the voltage standing wave ratio (VSWR) is depicted as a function of frequency. As can be appreciated, the VSWR approaches zero as the frequency reaches ¼ of the transmission wavelength. It should be noted that the longitudinal characteristic impedance Z1 for inner conductor 239 can be changed by modifying the configuration (i.e., length, thickness) of portions 249-2 and 250-2, which is highly desirable. Specifically, modifying the configuration of portions 249-2 and 250-2 enables the longitudinal characteristic impedance Z1 to be adjusted in length. As seen most clearly in FIG. 14, adjusting the longitudinal characteristic impedance Z1 and Z2 serves to tune the output of protective device 211.

In this capacity, the frequency output of protective device 211 can be adjusted by simply changing active length $L_{A1}$, active length $L_{A2}$ and/or the length of shunt conductor 265. As an example, the frequency output of protective device 211 could be changed by changing the length of portions 249-2 and 250-2. In fact, portions 249-2 and 250-2 could be removed altogether to modify the output frequency. Furthermore, with portions 249-2 and 250-2 removed, an annular groove could be formed into each of portions 249-1 and 250-1 adjacent inner conductor 239 to further modify the output frequency for protective device 211.

Figure 13:
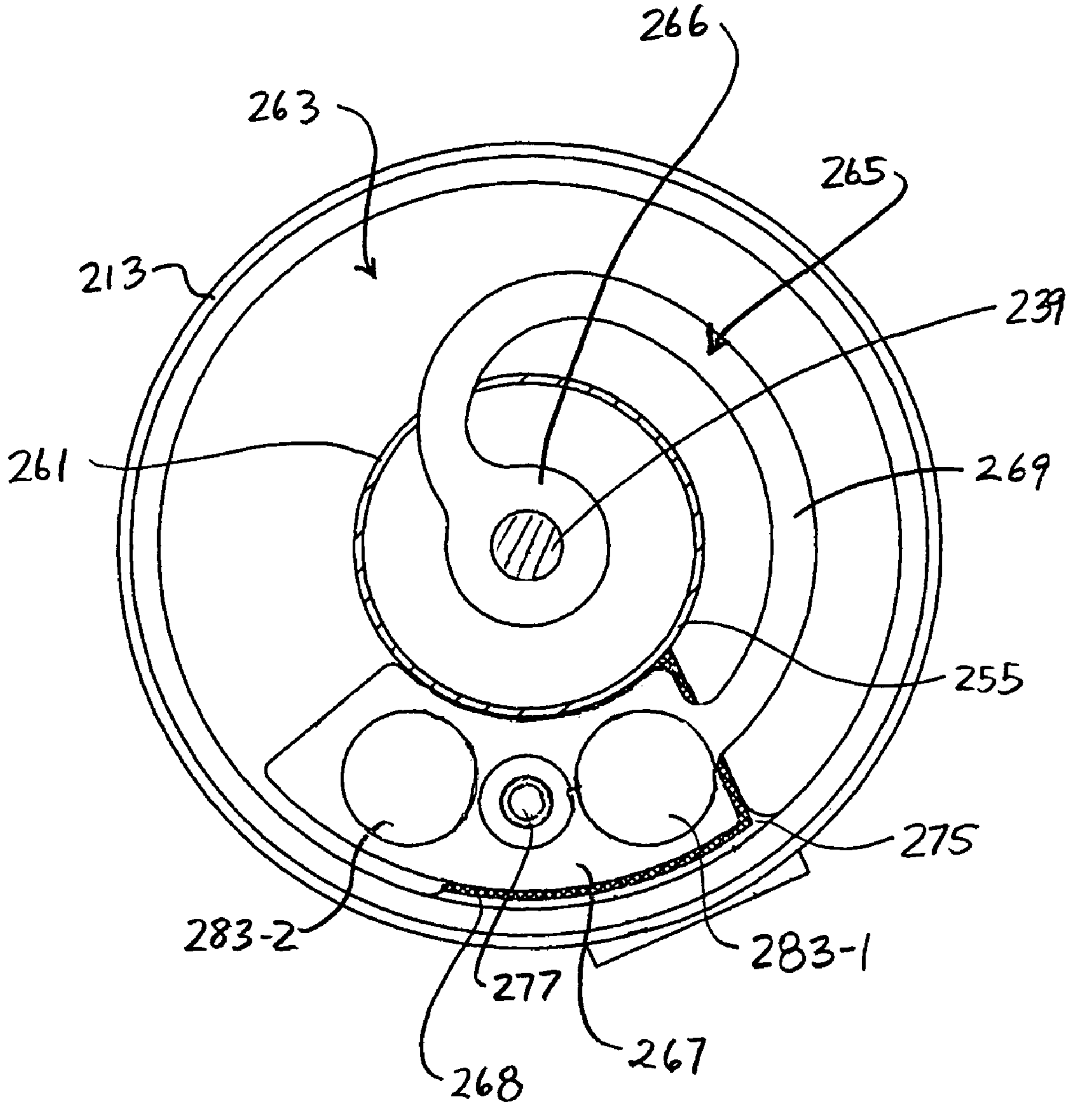
FIG. 13 is a section view of the protective device shown in FIG. 10, taken along lines 13-13, the protective device being shown with the end plug removed therefrom.

As seen most clearly in FIGS. 10 and 13, the outer surface of RFIC tube 255, the inner surface of body cover 217 and the inner surface of main body portion 215 together define a narrow, annularly shaped cavity, or volume region, 263 which wraps around RFIC tube 255.

A shunt conductor 265 connects inner conductor 239 with outer conductor 213. One of the principal distinctions between protective device 211 and protective device 11 is that protective device 211 comprises a compensated, or wide band, shunt conductor 265 whereas protective device 11 comprises an uncompensated, or narrow band, shunt conductor 65.

Shunt conductor 265 is constructed of a conductive material, such as copper, and comprises an annular first end 266, a second end 267 and a multi-sectioned curved intermediary portion 269 which connects first end 266 with second end 267. First end 266 is adapted to be slidably mounted onto pin 240 of inner conductor 239. Intermediary portion 269 of shunt 265 curves out from inner conductor 239, passes through slot 261 in RFIC tube 255 and then projects into cavity 263 along a first arcuate path. Intermediary portion 269 then extends in a concentric manner between RFIC tube 255 and outer conductor 213 along a second arcuate path which is approximately 180 degrees.

It should be noted that the cross-sectional diameter of first end 266 is greater than the cross-sectional diameter of inner conductor 239. As a result, the RF impedance at the junction of first end 266 and inner conductor 239 is significantly lowered, which is highly desirable. In addition, the capacitance to RFIC tube 255 and/or outer conductor 213 is increased at the junction of first end 266 and inner conductor 239, which improves RF performance.

The principal distinction between shunt conductor 65 and shunt conductor 265 is that shunt conductor 265 comprises a second end 267 which is in the form of an elongated, arcuate, flat plate. As seen most clearly in FIGS. 13 and 14, a thin layer of dielectric material 268 is disposed onto the bottom surface of second end 267. As an example, dielectric material 268 may be in the form of an adhesive strip (i.e., tape) which is affixed onto the bottom surface of second end 267. Second end 267 of shunt 265 is capacitively coupled to a raised platform 275 which is integrally formed onto outer conductor 213, second end 267 being held in position by an alignment pin 277 which extends therethrough and serves to facilitating in mounting body cover 217 onto main body portion 215. Raised platform 275 serves to keep shunt conductor 265 centrally located so that intermediary portion 269 of shunt conductor 265 is isolated from RFIC tube 255 and outer conductor 213. It should be noted that dielectric material 268 serves to insulate second end 267 of shunt conductor 265 from raised platform 275. As such, the integration of a flat plate into second end 267 serves to create a distributed capacitance in stub 265 to outer conductor 213 which acts through dielectric material 268. The capacitance created in second end 267 allows for stub 265 to be capacitively grounded, which is highly desirable, as the RF voltages are greatly reduced at this point and shunt conductor 265 can act as a $\lambda/4$ stub.

It should be noted that the length of second end 267 of shunt conductor 265 is substantially longer than the length of raised platform 275. As a result, the free end of second end 267 substantially overhangs raised platform, for reasons to become apparent below.

Three conventional 90 volt gas discharge tubes (GDT) 283 are mounted onto second end 267 of shunt conductor 265. Specifically, first and second gas discharge tubes 283-1 and 283-2 are mounted on the top surface of second end 267 in a spaced apart relationship. A third gas discharge tube 283-3 is mounted on the bottom surface of the portion of second end 267 which overhangs (i.e., extends past) raised platform 275, as seen most clearly in FIG. 14. Each of gas discharge tubes 283 aligns within an associated groove formed in outer conductor 213 and is urged into contact with second end 267 by a corresponding spring.

As can be appreciated, gas discharge tubes 283 represent any conventional voltage protective component which facilitates in the shunting of voltages which are above a pre-determined level. The plurality of gas discharge tubes 283 operate in parallel in shunting voltages. Accordingly, if one gas discharge tube 283 fails to operate over time, the remaining gas discharge tubes will continue to adequately shunt unwanted voltages. As a result, the implementation of multiple gas discharge tubes 283 serves to substantially increase the effective lifespan of protective device 11, which is a principal object of the present invention.

It should be noted that while there is very low RF voltage on second end 267 of shunt conductor 265 which is capacitively grounded, a DC connection to center conductor 239 remains intact. Connection to the grounded second end 267 of shunt conductor 265 and bringing this point out to the outside of outer conductor 213 can provide a DC tap connection for device 211. This DC tap connection to center conductor 239, with very low RF energy, is well within the scope of usefulness of this patent.

It should be noted that the ability for second end 267 of shunt conductor 265 to be capacitively grounded through dielectric material 268 provides protective device 211 with a significant advantage over protective devices 11 and 111. Specifically, the ability of shunt conductor 265 to be capacitively grounded via distributed capacitance enables protective device 211 to transmit direct current (DC) signals through inner conductor 239. To the contrary, protective devices 11 and 111 are precluded from transmitting DC signals through its inner conductor because one end of its stub is directly connected to ground. The capability of protective device 211 to transmit DC signals is important because certain coaxial devices require DC power to be sent through its center transmission line.

Also, because the protective GDTs 283 are in contact with shunt conductor 265, the distributed capacitance is experienced in the region of contact between GDTs 283 and shunt conductor 265. However, due to the distributed capacitance, there is little RF voltage experienced in the region of contact between GDTs 283 and shunt conductor 265. This action serves to decouple GDTs 283 from the RF passing through device 11, and dramatically reduces the deleterious effects of placing GDTs 283 directly on center conductor 239 of the through transmission line. As a result, a GDT connection is permissible from center conductor 239 to outer conductor 213 at higher frequencies than would otherwise be possible, with lower VSWR.

Although the protective devices of the present invention are represented herein as being substantially straight, or linear, it is to be understood that the protective devices of the present invention could have a different configuration, such as an L-shaped, or right angle, configuration or a T-shaped configuration, without departing from the spirit of the present invention. As can be appreciated, an L-shaped protective device would be particularly useful when turning a corner.

Figure 15:
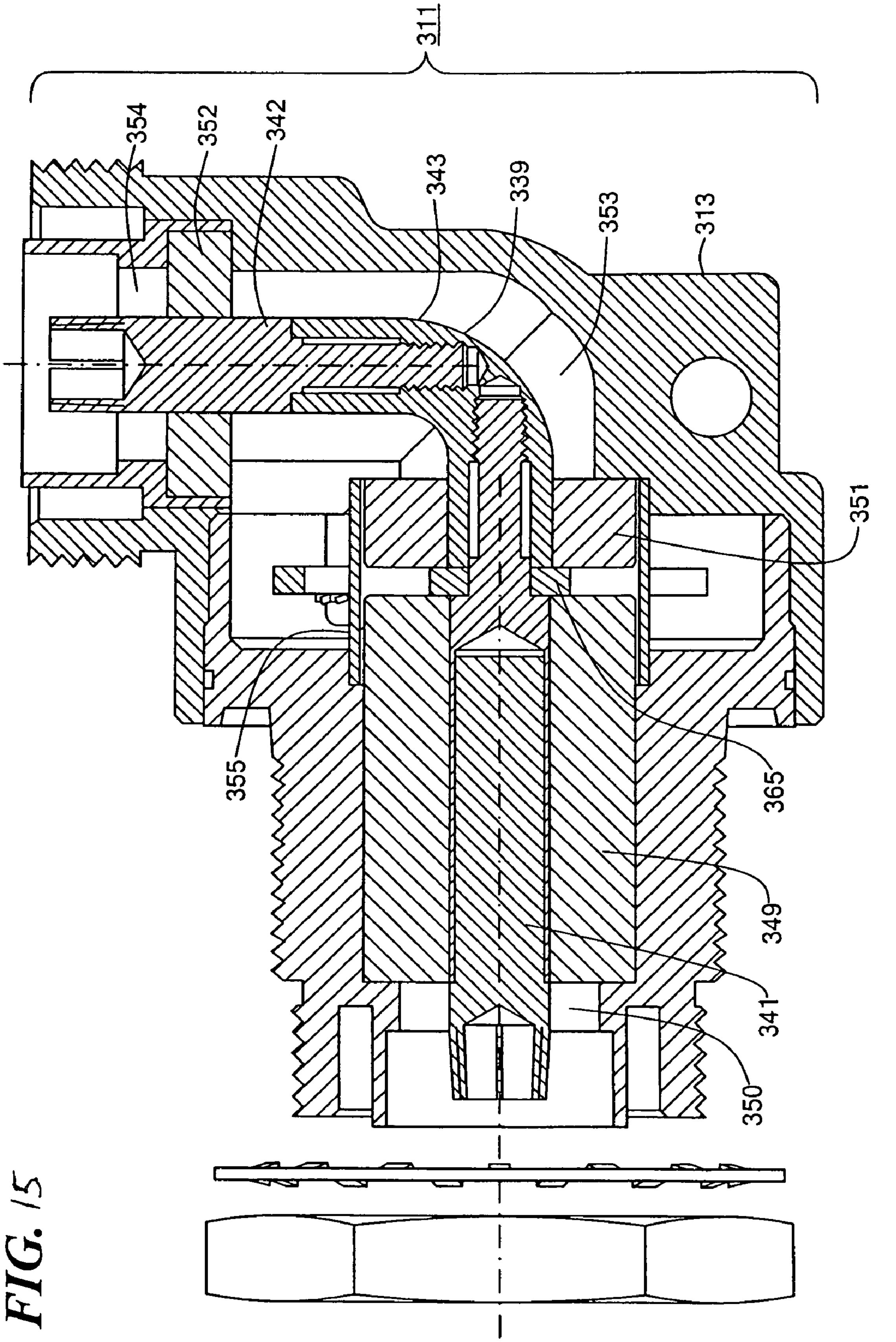
FIG. 15 is a section view of a fourth embodiment of a protective device constructed according to the teachings of the present invention.

As an example, referring now to FIG. 15, there is shown a fourth embodiment of a protective device constructed according to the teachings of the present invention, the protective device being identified generally by reference numeral 311. The principal distinction between protective device 311 and protective device 11 is that protective device 311 has an L-shaped configuration whereas protective device 11 has a straight configuration.

Specifically, protective device 311 comprises an L-shaped outer conductor 313 and an inner conductor 339 which is disposed along the longitudinal axis of outer conductor 313.

Inner conductor 339 comprises a first elongated member 341 and a second elongated member 342 which are connected together by an elbow portion 343, first elongated member 341 extending orthogonally relative to second elongated member 342.

Inner conductor 339 is similar in construction with inner conductor 239 in that inner conductor 339 does not include any sleeves, or spacers, for providing electrical continuity. Rather, the annular first end of a shunt conductor 365, first elongated member 341, second elongated member 342 and elbow portion 343 are all drawn in contact with one another so as to provide the electrical continuity for inner conductor 339, first elongated member 341, second elongated member 342 and elbow portion 343 all having a constant and equal cross-sectional diameter.

A first annularly shaped insulator 349 is mounted onto (i.e., wrapped around) the majority elongated member 341. In addition, a first annular dielectric medium 350 is formed around the remainder of elongated member, dielectric medium 350 being shown herein as being in the form of an air pocket. Together, insulator 349 and dielectric medium 350 form the active length of first elongated member 341.

A second annularly shaped insulator 351 is mounted onto (i.e., wrapped around) elbow portion 343. A third annularly shaped insulator 352 is mounted onto (i.e., wrapped around) second elongated member 342. In addition, a second annular dielectric medium 353 is formed around elbow portion 343 and second elongated member 342 between insulators 351 and 352, dielectric medium 353 being shown herein as being in the form of an air pocket. A third annular dielectric medium 354 is formed around second elongated member 342, dielectric medium 353 being shown herein as being in the form of an air pocket. Together, insulator 351, insulator 352, dielectric medium 353 and dielectric medium 354 form the active length of second elongated member 342 and elbow portion 343.

It should be noted that, by modifying the particular geometry of dielectric medium 354 or dielectric medium 350, the longitudinal characteristic impedance of protective device 311 can be adjusted in length. Adjusting the longitudinal characteristic impedance of protective device 311 can be used to tune, or optimize, the operational frequency of device 311, which is highly desirable.

Protective device 311 is similar in construction with protective device 211 in that protective device 311 comprises an RFIC tube 355, which is disposed between inner conductor 339 and outer conductor 313, and a shunt conductor 365 for filtering out from transmission line 339 those electromagnetic pulse signals which fall outside of the desired frequency band.

Figure 16:
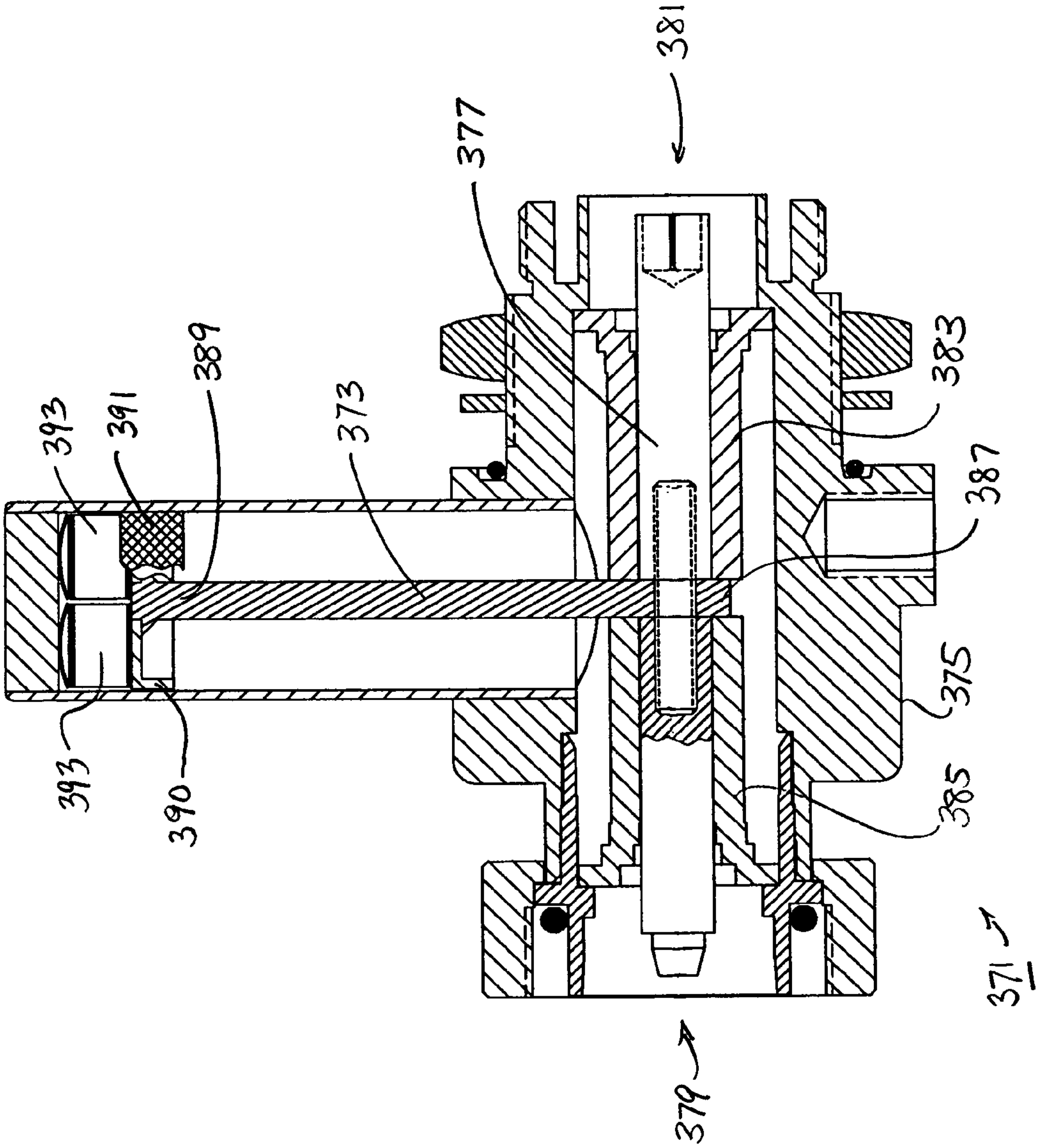
FIG. 16 is a section view of a fifth embodiment of a protective device constructed according to the teachings of the present invention.

As another example, referring now to FIG. 16, there is shown a fifth embodiment of a protective device constructed according to the teachings of the present invention, the protective device being identified generally by reference numeral 371. The principal distinction between protective device 371 and protective device 11 is that the general configuration of protective device 371 is T-shaped whereas the general configuration of protective device 11 is straight, protective device 371 comprising a shunt conductor 373 which is straight and protective device 11 comprising a shunt conductor 65 which is curved. Outer conductor 375 and inner conductor 377 for protective device 371 together form, at its opposite ends, two connector interfaces 379 and 381 which enable protective device 371 to be attached to mating connectors. Shunt conductor 373 for protective device 371 extends, with a specific impedance, a length which corresponds to a quarter-wave of the frequency of interest.

In addition, protective device 371 includes a pair of high dielectric insulators 383 and 385 which are wrapped along a portion of the length of inner conductor 377 on opposite sides of shunt conductor 373. The particular configuration of insulators 383 and 385 renders protective device 371 a narrow-band device. To render protective device 371 a wide-band device, insulators 383 and 385 can be replaced with insulators which define a smaller region of air between the insulators and outer conductor 375. For example, insulators 383 and 385 could be replaced with insulators 249 and 250 of protective device 211 in order to provide protective device 371 with wide-band capabilities, which is highly desirable.

Furthermore, shunt conductor 373 comprises a first end 387 and a second end 389. First end 387 is connected to inner conductor 377. An enlarged disc 390 is connected to second end 389. Disc 390 is capacitively connected to outer conductor 375 through a layer of dielectric material 391. A pair of voltage protective components (e.g., gas discharge tubes) 393 are mounted on disc 390 to facilitate in the shunting of undesirable voltages to outer conductor 375. In this manner, disc 390 provides a common electrical connection to the array of protective components 393 so that they may be treated as one electrical circuit.

It should be noted that, although the various embodiments of protective devices shown above provide either narrow-band or wide-band protection, it is to be understood that a single protective device could be constructed which could be easily modified to provide either narrow-band or wide-band RF performance.

Figure 17:
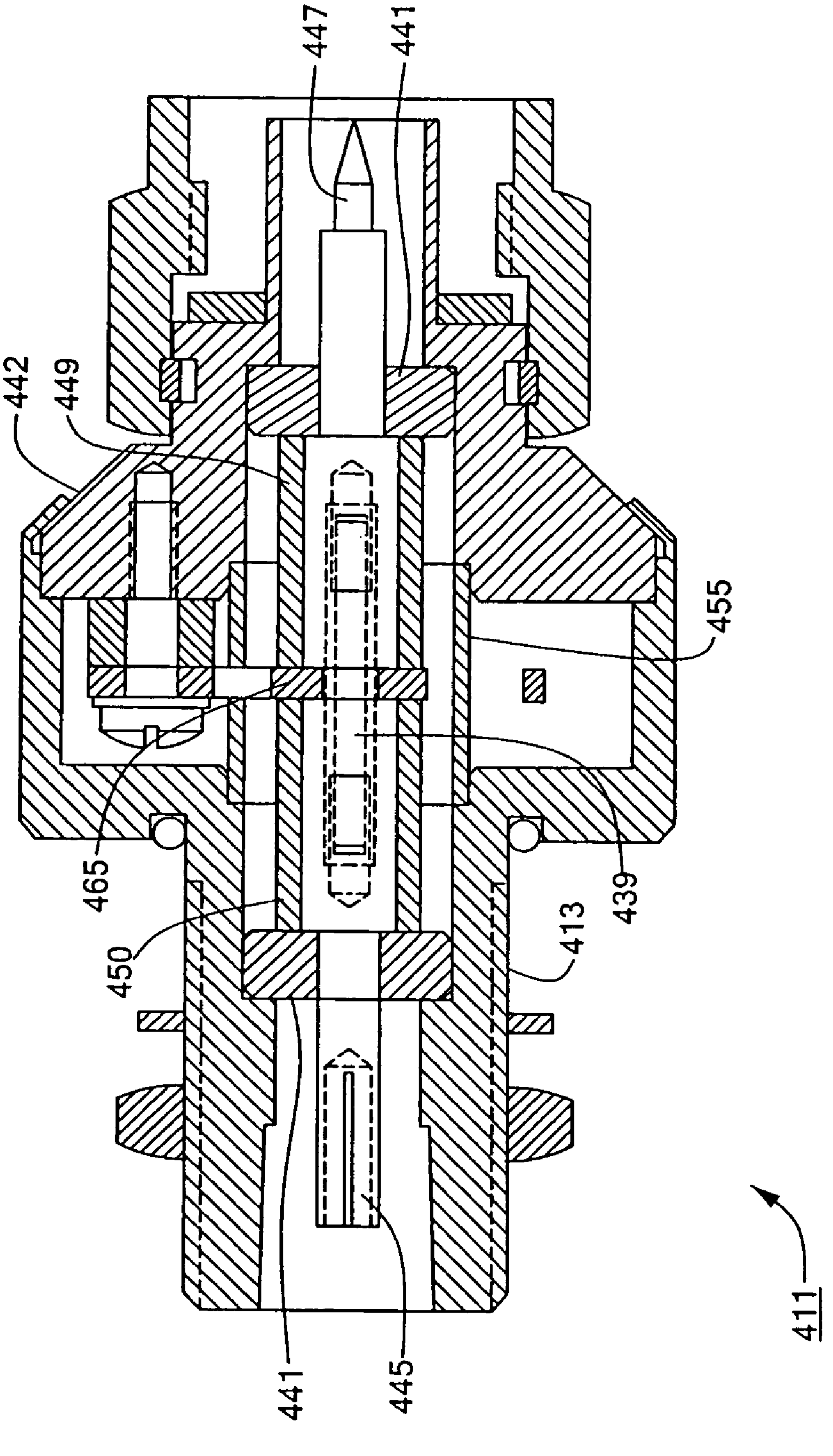
FIG. 17 is a section view of a sixth embodiment of a protective device constructed according to the teachings of the present invention.

Specifically, referring now to FIG. 17, there is shown a sixth embodiment of a protective device constructed according to the teachings of the present invention, the protective device being represented generally by reference numeral 411.

Figure 21:
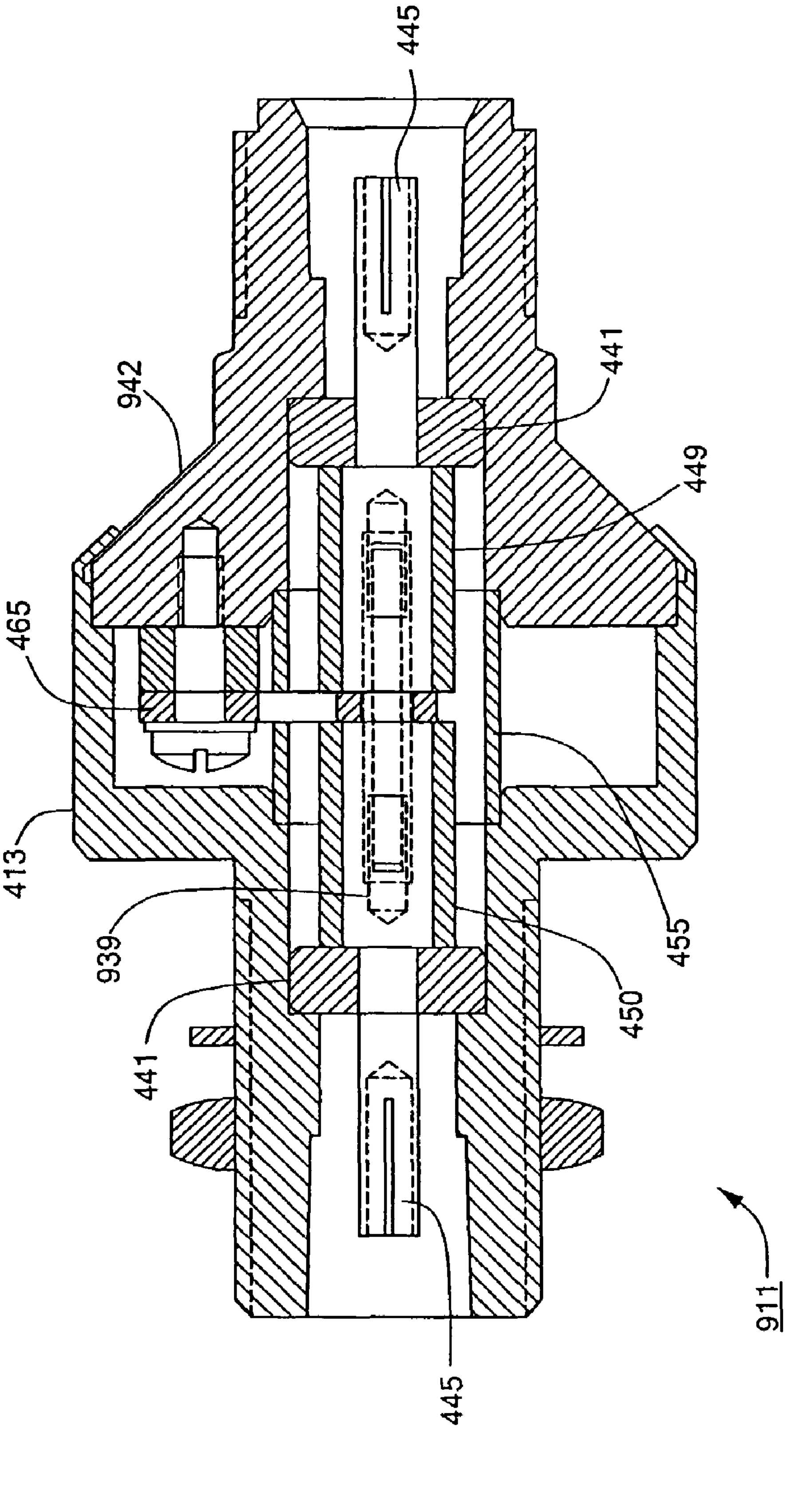
FIG. 21 is a section view of a tenth embodiment of a protective device constructed according to the teachings of the present invention.

Protective device 411 is similar in construction with protective device 11 in that protective device 411 comprises an outer conductor 413, an inner conductor 439 having a female pin 445 and a male pin 447, an RFIC tube 455, first and second annularly-shaped insulators 441, a cover 442 and a shunt conductor 465. Protective device 411 also comprises a pair of sleeves 449 and 450. Constructed as shown in FIG. 21, protective device 411 functions as a wide-band protective device. Sleeves 449 and 450 are used to reduce the impedance of the center conductor to create a wide band unit, as shown in FIG. 12.

Figure 18:
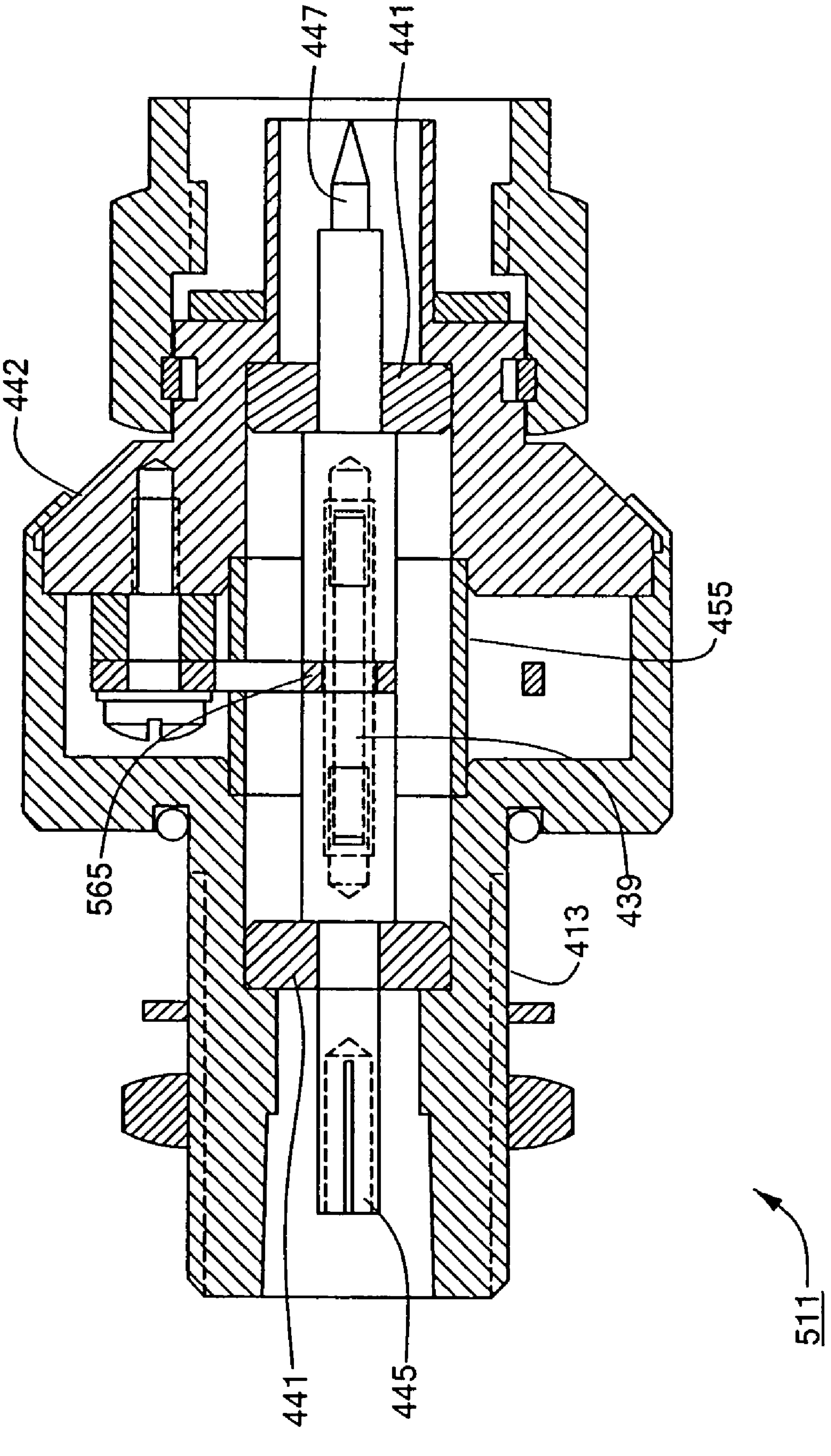
FIG. 18 is a section view of a seventh embodiment of a protective device constructed according to the teachings of the present invention.

The principal distinction between protective device 411 and protective device 11 is that protective device 411 can be easily reconfigured to provide narrow-band protection, which is highly desirable. Specifically, the removal of sleeves 449 and 450 from protective device 411 and the re-dimensioning of shunt conductor 465 (the re-dimensioned shunt conductor identified herein by reference numeral 565) creates a protective device which provides narrow-band protection, the resulting narrow-band protective device being shown in FIG. 18 and being represented by reference numeral 511. The shunt conductor can then be reconfigured in length to pass various bands.

It should be noted that, although the various embodiments of protective devices shown above comprise an inner conductor which includes a female pin and a male pin orientated so as to provide the protective device with a standard, or normal, polarity interfaces, it is to be understood that each of the interfaces for the inner conductor could be exchanged with a reverse polarity interface.

Figure 19:
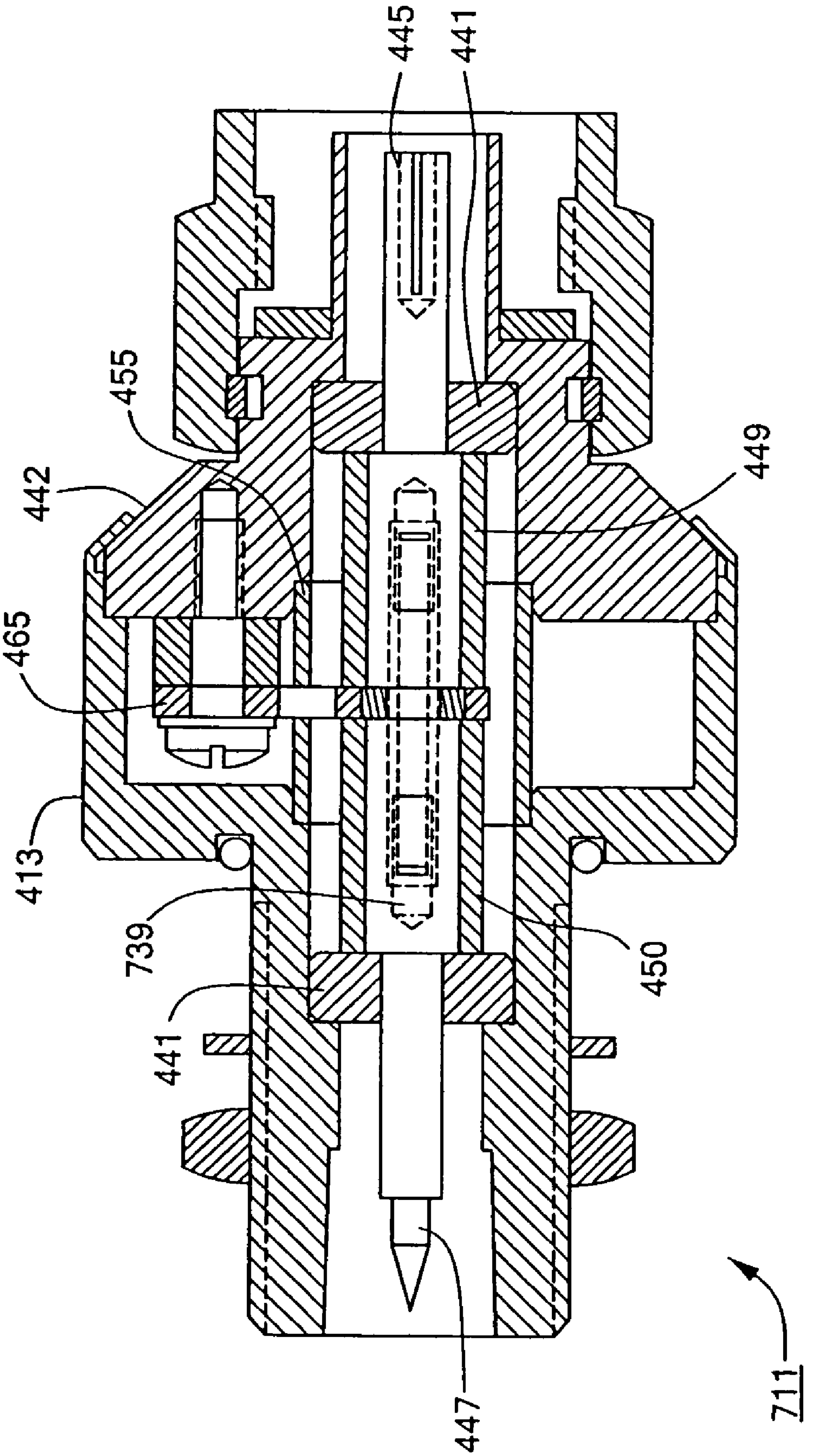
FIG. 19 is a section view of an eighth embodiment of a protective device constructed according to the teachings of the present invention.

As an example, referring now to FIG. 19, there is shown an eighth embodiment of a protective device constructed according to the teachings of the present invention, the protective device being represented generally by reference numeral 711. Protective device 711 is similar in many respects with protective device 511 in that protective device 711 comprises an outer conductor 413, an inner conductor 439, an RFIC tube 455 and a galvanically-grounded shunt conductor 465. The principal distinction between protective device 711 and protective device 511 is that protective device 711 comprises an inner conductor 439 which has a reverse polarity. Specifically, inner conductor 439 comprises a male pin, or connector, 447 at its first end and a female pin, or connector, 445 at its second end.

Figure 20:
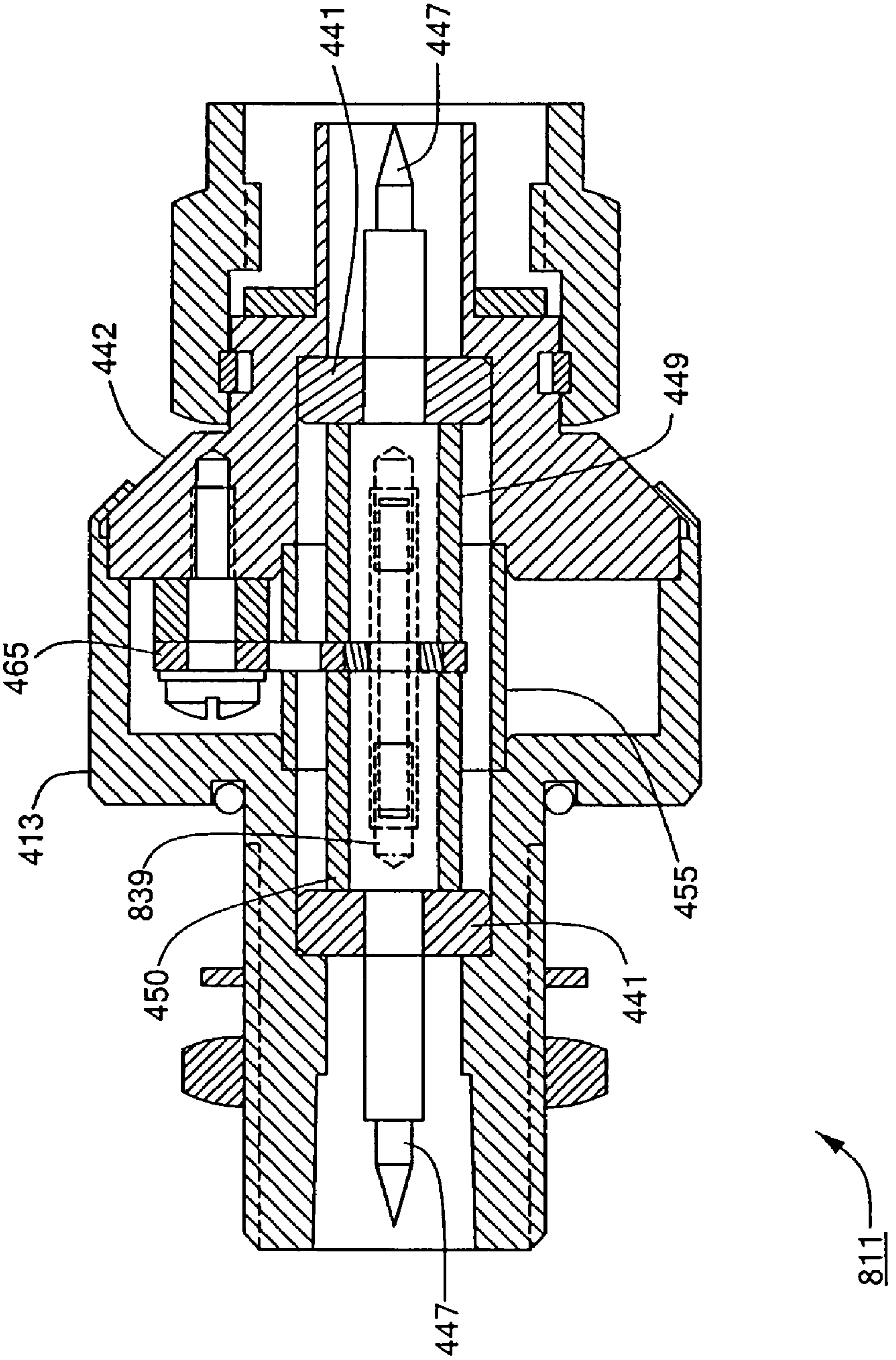
FIG. 20 is a section view of a ninth embodiment of a protective device constructed according to the teachings of the present invention.

As another example, referring now to FIG. 20, there is shown a ninth embodiment of a protective device constructed according to the teachings of the present invention, the protective device being represented generally by reference numeral 811. Protective device 811 is similar in many respects with protective device 511 in that protective device 811 comprises an outer conductor 413, an inner conductor 839, an RFIC tube 455 and a galvanically-grounded shunt conductor. The principal distinction between protective device 811 and protective device 511 is that protective device 811 comprises an inner conductor 839 which has male-male termination pins. Specifically, inner conductor 839 comprises identical male pins, or connectors, 447 at both its first and second ends. In this case, the left end is reverse polarity and the right end is normal polarity.

As another example, referring now to FIG. 21, there is shown a tenth embodiment of a protective device constructed according to the teachings of the present invention, the protective device being represented generally by reference numeral 911. Protective device 911 is similar in many respects with protective device 511 in that protective device 911 comprises an outer conductor 413, an inner conductor 439, an RFIC tube 455, an female cover 942, and a galvanically-grounded shunt conductor 465. The principal distinction between protective device 911 and protective device 511 is that protective device 911 comprises an inner conductor 939 which has female-female termination pins. Specifically, inner conductor 939 comprises identical female pins, or connectors, 445 at both its first and second ends.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

As an example, the center conductor pins of each embodiment may be made into an isolated pin with controlled transmission line impedance. This DC isolation will allow the intended RF energy to pass while reducing undesired lower frequency energy (due to lightening, for example). This isolation is accomplished by use of a pin and socket with a dielectric insulator separating these two members. A pin and socket produces a longitudinal shunt conductor or capacitive coupling which prevents DC continuity on the length of the center conductor. An important aspect of these isolation center conductor elements is that they are accomplished with either the same outer diameter as the non-isolated pins or constant outside diameter. This diameter makes it possible to determine impedance with a constant inside diameter of the outer conductor and the RFIC tube. Therefore, these pins can be used interchangeably with the same outer housings and stubs as in the disclosed embodiments. In some cases of compensated or wide-band products, the isolated center conductor may be of a different length and thus require a change in insulator or active lengths.

What is claimed is:

1. A voltage protective device comprising:

(a) a first conductor for transmitting electromagnetic signals of a desired frequency band, (b) a second conductor spaced apart from the first conductor, the second conductor serving as the return path for electromagnetic signals transmitted by the first conductor, (c) a shunt conductor for diverting electromagnetic signals transmitted by the first conductor that fall outside of the desired frequency band to the second conductor, the shunt conductor comprising a first end connected to the first conductor, a second end capacitively connected to the second conductor and an intermediary portion which connects the first end to the second end, and (d) a plurality of gas discharge tubes coupled in parallel between the shunt conductor and the second conductor, the plurality of gas discharge tubes operating in parallel with one another to discharge electromagnetic signals carried by the shunt conductor, each gas discharge tube being mounted on the shunt conductor and in conductive connection with the second conductor.

2. The protective device as claimed in claim 1 wherein the first conductor extends coaxially within the second conductor.

3. The protective device as claimed in claim 1 wherein the shunt conductor includes first and second opposing flattened surfaces proximate to its second end.

4. The protective device as claimed in claim 3 wherein the gas discharge tubes are mounted on the opposing surfaces of the shunt conductor.

5. The protective device as claimed in claim 4 wherein at least three gas discharge tubes are mounted on the shunt conductor.

* * * * *